United States Patent
Wang et al.

(10) Patent No.: US 12,406,485 B2
(45) Date of Patent: Sep. 2, 2025

(54) SYSTEMS AND METHODS FOR GENERATING AND DEPLOYING MACHINE LEARNING APPLICATIONS

(71) Applicant: ElectrifAI Opco, LLC, Morristown, NJ (US)

(72) Inventors: Luming Wang, Bellevue, WA (US); Jinhua Ma, Jersey City, NJ (US); Shahin Rahman, San Diego, CA (US); Geoffrey Xiao, Lexington, MA (US)

(73) Assignee: ElectrifAI Opco, LLC, Morristown, NJ (US)

( * ) Notice: Subject to any disclaimer, the term of this patent is extended or adjusted under 35 U.S.C. 154(b) by 356 days.

(21) Appl. No.: 17/875,861

(22) Filed: Jul. 28, 2022

(65) Prior Publication Data

US 2023/0035076 A1 Feb. 2, 2023

Related U.S. Application Data

(60) Provisional application No. 63/227,975, filed on Jul. 30, 2021.

(51) Int. Cl.
*G06V 10/82* (2022.01)
*G06F 9/445* (2018.01)
(Continued)

(52) U.S. Cl.
CPC .......... *G06V 10/82* (2022.01); *G06F 9/44505* (2013.01); *G06F 9/45504* (2013.01);
(Continued)

(58) Field of Classification Search
CPC ...... G06V 10/82; G06V 10/40; G06V 10/766; G06V 10/776; G06V 10/94; G06V 10/955;
(Continued)

(56) References Cited

U.S. PATENT DOCUMENTS 10,354,188 B2 * 7/2019 Chalabi ................. G06N 5/022
10,438,132 B2 * 10/2019 Duggan ................. G06F 16/22
(Continued)

OTHER PUBLICATIONS

International Search Report and Written Opinion for International Application No. PCT/US2022/038675 mailed Nov. 11, 2022.
(Continued)

*Primary Examiner* — Stephen R Koziol
*Assistant Examiner* — Benedict E Lee
(74) *Attorney, Agent, or Firm* — Wolf, Greenfield & Sacks, P.C.

(57) ABSTRACT

A method comprising receiving data associated with a business, the data comprising first values for first attributes; processing the data, in accordance with a common data attribute schema that indicates second attributes, to generate second values for at least some of the second attributes including a group of attributes, the second values including a group of attribute values for the group of attributes; identifying, using the common data attribute schema and from among pre-existing software codes, software code implementing an ML data processing pipeline configured to generate a group of feature values; processing the group of attribute values with the software code to obtain the group of feature values; and either providing the group of feature values as inputs to a machine learning (ML) model for generating corresponding ML model outputs, or using the group of feature values to train the ML model.

20 Claims, 21 Drawing Sheets

(51) Int. Cl.
*G06F 9/455* (2018.01)
*G06F 16/215* (2019.01)
*G06N 5/022* (2023.01)
*G06V 10/40* (2022.01)
*G06V 10/766* (2022.01)
*G06V 10/776* (2022.01)
*G06V 10/94* (2022.01)

(52) U.S. Cl.
CPC .......... *G06F 16/215* (2019.01); *G06N 5/022* (2013.01); *G06V 10/40* (2022.01); *G06V 10/766* (2022.01); *G06V 10/776* (2022.01); *G06V 10/955* (2022.01)

(58) Field of Classification Search
CPC .. G06F 9/44505; G06F 9/445; G06F 9/45504; G06F 16/215; G06F 2009/45579; G06F 2009/45595; G06F 9/45558; G06N 5/022; G06N 3/0499; G06N 20/10; G06N 3/10; G06Q 10/067; G06Q 30/0201
See application file for complete search history.

(56) References Cited

U.S. PATENT DOCUMENTS

| | | | |
|---|---|---|---|
| 10,459,888 B2* | 10/2019 | Wu | G06F 16/2465 |
| 10,990,901 B2* | 4/2021 | Deo | G06N 20/00 |
| 11,561,833 B1* | 1/2023 | Heaton | G06F 9/45504 |
| 2016/0132787 A1* | 5/2016 | Drevo | G06N 20/10 |
| | | | 706/12 |
| 2017/0103413 A1 | 4/2017 | He et al. | |
| 2017/0148430 A1* | 5/2017 | Lee | G10L 15/063 |
| 2017/0178020 A1* | 6/2017 | Duggan | G06F 16/22 |
| 2017/0213156 A1* | 7/2017 | Hammond | G06N 3/045 |
| 2019/0279043 A1* | 9/2019 | Cataltepe | G05B 13/028 |
| 2020/0042896 A1* | 2/2020 | Ko | G06F 17/15 |
| 2020/0160544 A1* | 5/2020 | Yao | G06F 18/217 |
| 2020/0272909 A1* | 8/2020 | Parmentier | G06N 3/126 |
| 2021/0117830 A1* | 4/2021 | Inakoshi | G06F 18/2148 |
| 2021/0150330 A1* | 5/2021 | Sharma | G06N 3/08 |
| 2021/0232388 A1* | 7/2021 | Mirantes | G06F 8/71 |
| 2022/0019451 A1* | 1/2022 | Crabtree | G06N 3/006 |
| 2022/0067580 A1* | 3/2022 | Rho | G06F 9/451 |

OTHER PUBLICATIONS

International Search Report and Written Opinion for International Application No. PCT/US2022/038671 mailed Nov. 21, 2022.

[No. Author Listed], Leverage Pre-Built Machine Learning (ML) Models to Accelerate Your ML Journey. ElectrifAi. Jul. 8, 2021. 10 pages. https://www.electrifai.net/blog/leverage-pre-built-machine-learning-ml-models-to-accelerate-your-ml-journey [Last accessed Nov. 15, 2022].

Gruendner et al., KETOS: Clinical decision support and machine learning as a service-A training and deployment platform based on Docker, OMOP-CDM, and FHIR Web Services. PloS one. Oct. 3, 2019;14(10):e0223010.

Rusch, Exploration-Exploitation Trade-off in Deep Reinforcement Learning. Bachelor Thesis, Distributed Computing Group. Computer Engineering and Networks Laboratory ETH Zurich. Aug. 2018. 47 pages.

Suryanarayanan et al., A Canonical Architecture For Predictive Analytics on Longitudinal Patient Records. arXiv preprint arXiv:2007.12780. Jan. 5, 2021.

* cited by examiner

Common Data Attribute Schema 400

Common attributes 402
- Customer ID (mandatory)
- Account open date (mandatory)
- Delivery methods (mandatory)
- Payment methods (mandatory)
- Preferred language (mandatory)
- Preferred communication channel (mandatory)
- Email/Phone/Text message (optional)
- Address (optional)
- Credit score (optional)
- Social media addresses (optional)
- Web/app browsing history (optional)
- ...

Market segment attributes 404
- Product purchased (mandatory)
- Date/Time of purchase (mandatory)
- Price (mandatory)
- Return (optional)
- Customer call/feedback (optional)
- Product regular price (optional)
- Product promotion within a month before and after purchase (optional)
- Product rating (optional)
- ...

Business specific attributes 406
- Product SKUID (mandatory)
- Product features (optional)
- Competing product ID (optional)
- Competing product features (optional)
- Competing product price (optional)
- Store location (mandatory)
- Store open hours (mandatory)
- Store size (mandatory)
- Store sales history (mandatory)
- Promotion history (optional)
- Loyalty program (optional)
- ...

Additional attributes 408
- Nearby hotel booking history
- Nearby restaurant reservation history
- ...

FIG. 4

SYSTEMS AND METHODS FOR GENERATING AND DEPLOYING MACHINE LEARNING APPLICATIONS

CROSS-REFERENCE TO RELATED APPLICATIONS

This application claims the benefit of priority, under 35 U.S.C. § 119, to U.S. Provisional Patent Application Ser. No. 63/227,975, filed on Jul. 30, 2021, titled "Systems and Methods for Generating and Deploying Machine Learning Applications", which is incorporated by reference herein in its entirety.

BACKGROUND

Machine learning models are widely applied to multiple different types of problems in multiple different applications. A machine learning model contains multiple parameters. Prior to being applied to a particular problem, a machine learning model is trained by using training data to estimate values of its parameters. The resulting trained machine learning model may be applied to input data to produce corresponding outputs.

SUMMARY

Some embodiments provide for a method for using virtualized machine learning (ML) application programs associated with different ML tasks, the method comprising: using at least one computer hardware processor, which is configured to execute virtualized application programs, to perform: loading a virtualized ML application program comprising a plurality of software modules, the plurality of software modules including: a first software module configured to apply one or more ML data processing pipelines to received data to generate input data for providing as input to an ML model associated with a respective ML task; and a second software module configured to perform inference using the ML model; using the first software module to: (a) receive data, via at least one communication network, from a source external to the virtualized ML application program; and (b) process the received data using the one or more ML data processing pipelines to generate the input data; and using the second software module to apply the ML model to the input data generated using the first software module to produce corresponding ML model output.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform a method for using virtualized machine learning (ML) application programs associated with different ML tasks, the method comprising: using at least one computer hardware processor, which is configured to execute virtualized application programs, to perform: loading a virtualized ML application program comprising a plurality of software modules, the plurality of software modules including: a first software module configured to apply one or more ML data processing pipelines to received data to generate input data for providing as input to an ML model associated with a respective ML task; and a second software module configured to perform inference using the ML model; using the first software module to: (a) receive data, via at least one communication network, from a source external to the virtualized ML application program; and (b) process the received data using the one or more ML data processing pipelines to generate the input data; and using the second software module to apply the ML model to the input data generated using the first software module to produce corresponding ML model output.

Some embodiments provide for at least one non-transitory computer-readable storage medium storing processor executable instructions that, when executed by at least one computer hardware processor, cause the at least one computer hardware processor to perform a method for using virtualized machine learning (ML) application programs associated with different ML tasks, the method comprising: using at least one computer hardware processor, which is configured to execute virtualized application programs, to perform: loading a virtualized ML application program comprising a plurality of software modules, the plurality of software modules including: a first software module configured to apply one or more ML data processing pipelines to received data to generate input data for providing as input to an ML model associated with a respective ML task; and a second software module configured to perform inference using the ML model; using the first software module to: (a) receive data, via at least one communication network, from a source external to the virtualized ML application program; and (b) process the received data using the one or more ML data processing pipelines to generate the input data; and using the second software module to apply the ML model to the input data generated using the first software module to produce corresponding ML model output.

In some embodiments, the plurality of software modules further comprises a third software module configured to train the ML model, the method further comprising: using the third software module to train the ML model using the input data.

In some embodiments, the input data comprises training data having a plurality of training inputs and a corresponding plurality of ground-truth outputs, the ML model comprises a plurality of parameters, and using the third software module to train the ML model comprises estimating values of at least some of the plurality of parameters using the training data.

In some embodiments, the estimating is performed using one or more software libraries part of the third software module in the virtualized ML application program.

In some embodiments, the plurality of software modules further comprises a fourth software module configured to generate information explaining performance of the ML model, the method further comprising: using the fourth software module to generate information explaining performance of the ML model on the input data.

In some embodiments, the input data comprises a plurality of values for a respective plurality of features; and the information explaining performance of the ML model on the input data indicates, for at least some of the plurality of features, relative degrees to which the at least some of the plurality of features influenced the ML model output.

In some embodiments, the input data comprises a plurality of values for a respective plurality of features; and the information explaining performance of the ML model on the input data indicates, for each of at least some of the plurality of features, a sensitivity of the ML model output to changes in a value of the feature.

In some embodiments, the ML model comprises a multi-layer neural network configured to detect objects in images, the input data comprises an input image, and the information explaining performance of the ML model on the input data comprises information explaining performance of the multi-layer neural network on the input image.

In some embodiments, the information explaining the performance of the multi-layer neural network on the input images comprises: information indicating, for at least some pixels in the input image, relative degrees to which the at least some of the pixels influenced the ML model output; and information indicating, for each of the at least some of the pixels, a sensitivity of the ML model output to changes in a value of the pixel.

In some embodiments, the received data comprises attribute values for a plurality of attributes, the input data comprises feature values for a plurality of features, and the one or more ML data processing pipelines are configured to process the received data by: applying one or more data cleansing procedures to at least some of the attribute values to obtain cleansed attribute values; and applying one or more feature extraction procedures to the cleansed attribute values to obtain the feature values.

In some embodiments, the plurality of attributes comprises groups of attributes including a first group of attributes and a second group of attributes, the attribute values comprise groups of attribute values including a first group of attribute values for the first group of attributes and a second group of attribute values for the second group of attributes, the plurality of features comprises groups of features including a first group of features and a second group of features, the feature values comprise groups of feature values including a first group of feature values for the first group of features and a second group of feature values for the second group of features, and the one or more ML data processing pipelines comprise: a first ML data processing pipeline to generate the first group of feature values from the first group of attribute values using first data cleansing procedures and first feature extraction procedures; a second ML data processing pipeline to generate the second group of feature values from the second group of attribute values using second data cleansing procedures different from the first data cleansing procedures and second feature extraction procedures different from the first feature extraction procedures.

In some embodiments, the source external to the virtualized ML application program comprises a data store part of a computing system that does not execute the virtualized ML application program.

In some embodiments, the method further comprises providing, via the at least one communication network, the ML model output to the source external to the virtualized ML application program.

In some embodiments, the first software module comprises processor-executable instructions that, when executed by the at least one computer hardware processor, cause the at least one computer hardware processor to (a) receive the data, via the at least one communication network, from the source external to the virtualized ML application program; and (b) process the received data using the one or more ML data processing pipelines to generate the input data.

In some embodiments, the second software module comprises processor-executable instructions that, when executed by the at least one computer hardware processor, cause the at least one computer hardware processor to apply the ML model to the input data generated using the first software module to produce the corresponding ML model output.

In some embodiments, the at least one computer hardware processor is configured to execute a virtualized application software engine, the virtualized application software engine is configured to execute multiple different virtualized ML application programs corresponding to different ML tasks, and the method further comprises executing, with the virtualized application software engine, the multiple different virtualized ML application programs corresponding to the different ML tasks.

In some embodiments, the virtualized ML application program comprises a virtual machine configured to execute an ML application program comprising the plurality of software modules.

In some embodiments, the virtualized ML application program comprises a containerized application program comprising the plurality of software modules.

In some embodiments, the ML model comprises a linear regression model or a non-linear regression model.

In some embodiments, the ML model comprises an ML model configured to map inputs to outputs in a finite set of outputs corresponding to classification labels or actions.

Some embodiments provide for a method, comprising: using at least one computer hardware processor to perform: (A) receiving first data associated with a business, the first data comprising a first plurality of values for a first plurality of attributes; (B) processing the first data, in accordance with a common data attribute schema that indicates a second plurality of attributes, to generate a second plurality of values for at least some of the second plurality of attributes, wherein the at least some of the second plurality of attributes include a first group of attributes, and wherein the second plurality of values includes a first group of attribute values for the first group of attributes; (C) identifying, using the common data attribute schema and from among a plurality of pre-existing software codes, first software code implementing a first ML data processing pipeline configured to generate a first group of feature values, for a respective first group of features, from the first group of attribute values; (D) processing the first group of attribute values with the first software code to obtain the first group of feature values; and (E) either: (i) providing the first group of feature values as inputs to a machine learning (ML) model for generating corresponding ML model outputs, or (ii) using the first group of feature values to train the ML model.

Some embodiments provide for a system, comprising: at least one computer hardware processor; and at least one non-transitory computer-readable storage medium storing processor executable instructions that, when executed by the at least one computer hardware processor, cause the at least one computer hardware processor to perform a method, comprising: (A) receiving first data associated with a business, the first data comprising a first plurality of values for a first plurality of attributes; (B) processing the first data, in accordance with a common data attribute schema that indicates a second plurality of attributes, to generate a second plurality of values for at least some of the second plurality of attributes, wherein the at least some of the second plurality of attributes include a first group of attributes, and wherein the second plurality of values includes a first group of attribute values for the first group of attributes; (C) identifying, using the common data attribute schema and from among a plurality of pre-existing software codes, first software code implementing a first ML data processing pipeline configured to generate a first group of feature values, for a respective first group of features, from the first group of attribute values; (D) processing the first group of attribute values with the first software code to obtain the first group of feature values; and (E) either: (i) providing the first group of feature values as inputs to a machine learning (ML) model for generating corresponding ML model outputs, or (ii) using the first group of feature values to train the ML model.

Some embodiments provide for at least one non-transitory computer-readable storage medium storing processor executable instructions that, when executed by at least one computer hardware processor, cause the at least one computer hardware processor to perform a method, comprising: (A) receiving first data associated with a business, the first data comprising a first plurality of values for a first plurality of attributes; (B) processing the first data, in accordance with a common data attribute schema that indicates a second plurality of attributes, to generate a second plurality of values for at least some of the second plurality of attributes, wherein the at least some of the second plurality of attributes include a first group of attributes, and wherein the second plurality of values includes a first group of attribute values for the first group of attributes; (C) identifying, using the common data attribute schema and from among a plurality of pre-existing software codes, first software code implementing a first ML data processing pipeline configured to generate a first group of feature values, for a respective first group of features, from the first group of attribute values; (D) processing the first group of attribute values with the first software code to obtain the first group of feature values; and (E) either: (i) providing the first group of feature values as inputs to a machine learning (ML) model for generating corresponding ML model outputs, or (ii) using the first group of feature values to train the ML model.

In some embodiments, the at least some of the second plurality of attributes include a second group of attributes different from the first group of attributes, and the second plurality of values includes a second group of attribute values for the second group of attributes, act (C) further comprises: identifying, using the common data attribute schema and from the plurality of pre-existing software codes, second software code implementing a second ML data processing pipeline, different from the first ML data processing pipeline, configured to generate a second group of feature values, for a respective second group of features, from the second group of attribute values, act (D) further comprises: processing the second group of attribute values with the second software code to obtain the second group of feature values, and act (E) further comprises: either: (i) providing the second group of feature values as inputs to the ML model for generating the corresponding ML model outputs, or (ii) using the second group of feature values to train the ML model.

In some embodiments, acts (A)-(E) are performed by a virtualized ML application program executing using the at least one processor.

In some embodiments, the common data attribute schema indicates which attributes in the second plurality of attributes are mandatory or optional.

In some embodiments, processing the first data comprises: accessing values for those attributes, among the first plurality of attributes, that are indicated as being mandatory by the common data attribute schema; and generating an error notification when the first data does not include values for at least one of the attributes indicated as being mandatory by the common data attribute schema.

In some embodiments, the common data attribute schema indicates a format for the second plurality of values, and processing the first data in accordance with the common data attribute schema comprises formatting the accessed values according to the format indicated by the common data attribute schema.

In some embodiments, the common data attribute schema categorizes attributes in the second plurality of attributes into multiple categories, the multiple categories including: a common attribute category; a market segment attribute category; and a business specific attribute category.

In some embodiments, the method further comprises updating the common data attribute schema to include one or more attributes part of the first plurality of attributes, but not part of the second plurality of attributes.

In some embodiments, acts (C) and (D) are performed automatically based on information in the common data attribute schema.

In some embodiments, the first software code implementing the first ML data processing pipeline is configured to, when executed, generate the first group of feature values from the first group of attribute values using first data cleansing procedures and first feature extraction procedures.

In some embodiments, the second software code implementing the second ML data processing pipeline is configured to, when executed, generate the second group of feature values from the second group of attribute values using second data cleansing procedures different from the first data cleansing procedures and second feature extraction procedures different from the first feature extraction procedures.

It should be appreciated that all combinations of the foregoing concepts and additional concepts described in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

FIG. 4 is a block diagram illustrating another common data attribute schema, in accordance with some embodiments of the technology described herein;

DETAILED DESCRIPTION

Aspects of the technology described herein relate to improvements in machine learning (ML) technology. In particular, the inventors have developed improved systems and method for generating and deploying ML applications.

Enterprises, businesses, and individuals apply ML techniques to collected data and use the resulting predictions in a wide variety of applications including for improving processes and for aiding decision making. For example, a business may apply ML techniques to data collected for multiple customers and create an ML model to determine whether to send a promotional message to one or more of the business's customers. Conventionally, a business can hire a data analyst (or a data analysis firm), give them some data pertaining to the business's customers, and ask the data analyst to manually process the data and create an ML model for a problem the business is trying to address, such as a decision whether to send a promotional message to one or more customers. The data analyst manually reviews and processes the business's data, and creates an ML model for making the decision of whether to send the promotional message. While such an approach can be very customized, it is time consuming, expensive, and error prone, as the collected data needs to be manually processed (e.g., hand picking data attributes and creating one or more features from the data attributes), and a custom data processing and model implementation needs to be created and deployed (e.g., on a specific platform for the business) for each problem that the business wants to address using its collected data. Further, if a new business in a same or similar market segment and having a similar problem were to hire the data analyst, conventionally the data analyst would apply the same manual approach all over again. The data analyst would not be able to leverage the previously-developed software or ML models to facilitate developing a new ML model for the similar problem.

Figure 1:
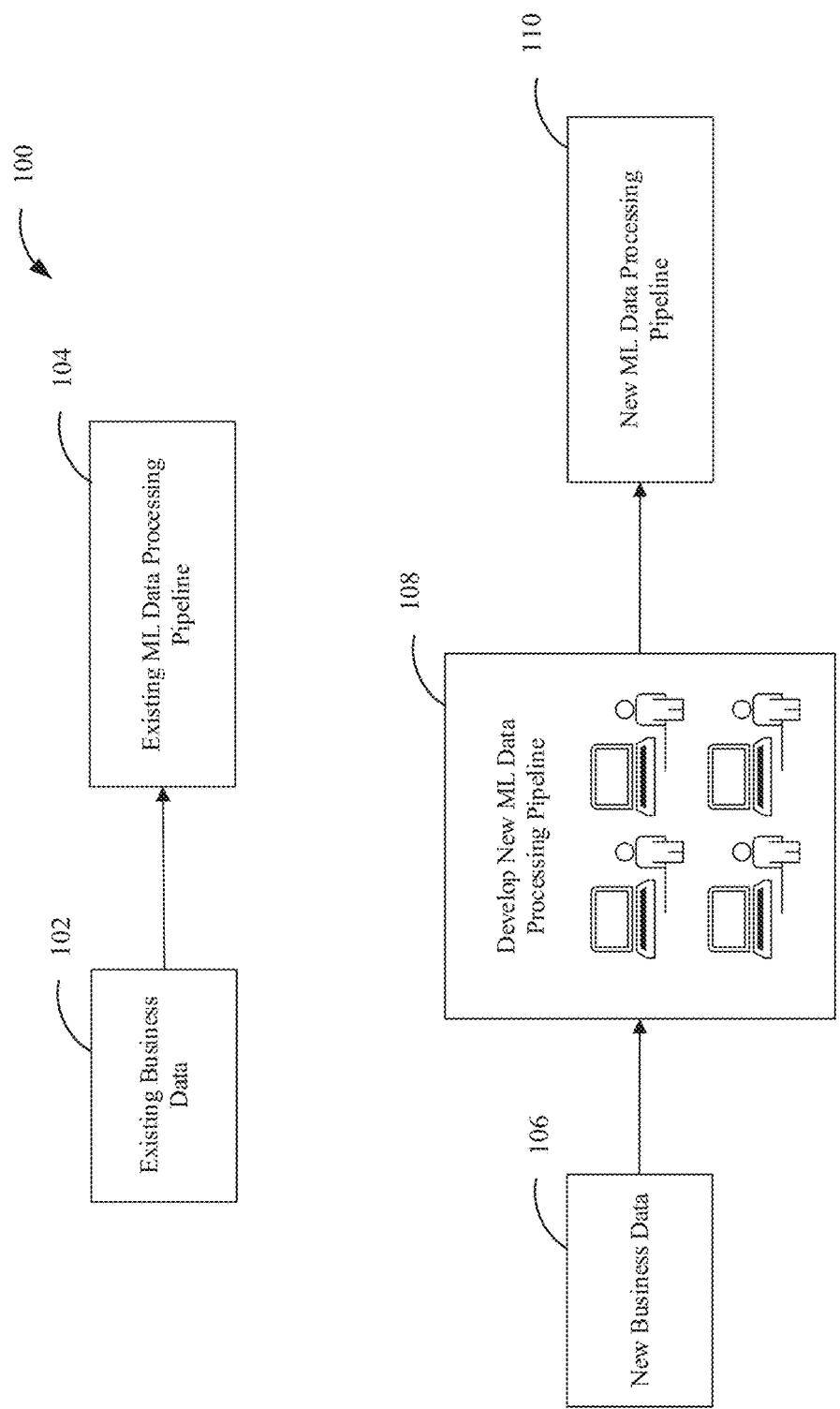
FIG. 1 is a block diagram showing a conventional approach to generating and deploying machine learning (ML) models.

The inventors have recognized that conventional techniques for generating and deploying ML models fail to leverage past data processing and ML model implementations for addressing similar problems for which the data analyst may have manually processed collected data and created an ML model. For example, FIG. 1 illustrates a conventional approach 100 for generating and deploying ML models. As shown in FIG. 1, after the data analyst has created an ML data processing pipeline 104 (e.g., software code for data cleansing, feature extraction, and/or any other suitable code for processing input data) for a business, the business may supply business data 102 to the existing ML data processing pipeline 104 to train or use ML models to solve the business's problem. However, if a new business hires the data analyst and provides business data 106 or the existing business provides new business data that is different (e.g., collected from a different source within the business), the data analyst cannot leverage the existing ML data processing pipeline 104. Instead, the data analyst (or multiple analysts, as the case may be, as shown in 108) has to expend considerable time in order to develop a new ML data processing pipeline 110, which is expensive. Further, even after expending considerable resources, the new ML pipeline may contain multiple errors because it does not leverage any of the existing software code previously developed made for addressing a similar problem.

The inventors have recognized that conventional techniques for generating and deploying ML models suffer from numerous drawbacks described above and can be improved. The inventors have developed techniques to leverage pre-existing software for addressing a given ML task. For example, the described systems and methods can be used to identify, for a given ML task, pre-existing software code that implements one or more ML data processing pipelines to allow for rapidly generating and deploying ML models. In this way, the techniques developed by the inventors improve ML technology by leveraging pre-existing software to increase speed and reduce errors for data processing and generating and deploying ML models. Additionally, the developed techniques save time and cost compared to conventional techniques where data analysts manually review and process data in order to create ML models.

To this end, the inventors have developed a common data attribute schema to aid in collecting data from a business and mapping at least some of the received data to one or more pre-existing software codes implementing one or more ML data processing pipelines. The common data attribute schema indicates one or more attributes for which corresponding software codes for ML data processing pipelines are included in the pre-existing software codes. Attribute values are generated from the received data for at least some of the attributes indicated in the common data attribute schema. Groups of one or more attribute values are provided to corresponding software codes implementing ML data processing pipelines to generate input data for training an ML model and/or using the ML model for inference. The developed techniques can process the received data in an end-to-end manner by using the common data attribute schema to automatically generate attribute values, identify pre-existing software codes corresponding to groups of attribute values, direct the groups of attribute values to corresponding ML data processing pipelines to generate training data for training an ML model, and generate and deploy the ML model. In this way, the techniques developed by the inventors improve ML technology by using the common data attribute schema to automatically identify, from pre-existing software codes for ML data processing pipelines, software code to process received data from a business and automatically generate and deploy an ML model based on the processed data.

There are various aspects of the techniques developed by the inventors that enable the improvements to ML technology described above. In some aspects, a method includes receiving first data associated with a business (e.g., a retailer or any other suitable business) and processing the received first data using a common data attribute scheme. The first data includes first values for first attributes (e.g., attributes related to a customer of a retailer, such as Customer ID, Account Open Date, etc., or any other suitable attribute). The common data attribute schema may be of any suitable type (e.g., as described with respect to FIG. 3) indicates second attributes, to generate second values for at least some of the second attributes. At least some of the second attributes for which the second values are generated include a first group of attributes. The second values for at least some of the second attributes include a first group of attribute values for the first group of attributes. The method further includes identifying, using the common data attribute schema and from among pre-existing software codes (e.g., software codes for implementing one or more ML data processing pipelines; also described with respect to FIG. 2D), first software code implementing a first ML data processing pipeline configured to generate a first group of feature values, for a respective first group of features, from the first group of attribute values. For example, the first group of attribute values may include a value for attribute, Account Open Date, for a customer of a retailer business. The respective first group of features may include Account Age, Account Open Year, Account Open Month, Days To Next Renewal, or any other suitable feature. The method further includes processing the first group of attribute values with the first software code to obtain the first group of feature values. The method further includes either: (i) providing the first group of feature values as inputs to an ML model for generating corresponding ML model outputs, or (ii) using the first group of feature values to train the ML model (e.g., to initially train the ML model or to update a trained ML model).

In some embodiments, the above-described acts are performed by a virtualized ML application program executing using at least one processor. In some embodiments, a virtualized application program may be any application program configured to execute on a virtual machine (e.g., a VMWARE virtual machine, an AZURE virtual machine, or any other suitable virtual machine). In some embodiments, a virtualized application program may be a containerized application program configured to execute in a container (e.g., a DOCKER container, a MOBY container, or any other suitable type of container or container framework).

In some embodiments, some of the second attributes include a second group of attributes different from the first group of attributes, and the second values includes a second group of attribute values for the second group of attributes. The act of identifying the first software code further includes identifying, using the common data attribute schema and from the pre-existing software codes, second software code implementing a second ML data processing pipeline, different from the first ML data processing pipeline, configured to generate a second group of feature values, for a respective second group of features, from the second group of attribute values. The act of processing the first group of attributes values with the first software code to obtain the first group of feature values further comprises processing the second group of attribute values with the second software code to obtain the second group of feature values. The act of either providing the first group of feature values as inputs to an ML model or using the first group of feature values to train the ML model further includes: either: (i) providing the second group of feature values as inputs to the ML model for generating the corresponding ML model outputs, or (ii) using the second group of feature values to train the ML model.

In some embodiments, the common data attribute schema indicates which attributes in the second attributes are mandatory or optional. For example, mandatory attributes may be required in order for the data to be processed by an ML data processing pipeline and may require the processor to generate an error notification when values are missing for one or more mandatory attributes (e.g., a common data attribute schema for an ML task for a retailer may specify Customer ID or any other suitable attribute as a mandatory attribute; also described with respect to FIG. 4). In another example, optional attributes may not be required in order for the data to be processed by an ML data processing pipeline. The processor may ignore the optional attribute, replace a value for the optional attribute with average value, a default value, or any other suitable value for the optional attribute, or otherwise address the missing value for the optional attribute without generating an error notification.

In some embodiments, processing the first data comprises accessing values for those attributes, among the first attributes, that are indicated as being mandatory by the common data attribute schema and generating an error notification when the first data does not include values for at least one of the attributes indicated as being mandatory by the common data attribute schema. For example, the processor may perform these acts as part of a data quality check in order to ensure that values for mandatory attributes are available from the business.

In some embodiments, the common data attribute schema indicates a format for the second values. The act of processing the first data in accordance with the common data attribute schema includes formatting the accessed values according to the format indicated by the common data attribute schema. For example, the format may include an ordering of the attributes, a file format (e.g., comma-separated values, EXCEL spreadsheet, etc.), or any other suitable format.

In some embodiments, the common data attribute schema categorizes attributes in the second plurality of attributes into multiple categories, the multiple categories including a common attribute category (e.g., a common data attribute schema for an ML task for a retailer may specify Customer ID as a common attribute, and a common data attribute schema for an ML task for a telecom provider may also specify Customer ID as a common attribute, where each of the retailer and the telecom provider can provide this attribute), a market segment attribute category (e.g., a common data attribute schema for an ML task for a retailer may specify Product Purchased as a market segment attribute provided by the retailer, while a common data attribute schema for an ML task for a telecom provider may specify Service Subscribed as a market segment attribute provided by the telecom provider), and a business specific attribute category (e.g., a common data attribute schema for an ML task for a first retailer may specify Product Model as a business specific attribute provided by the first retailer, while a common data attribute schema for an ML task for a second retailer may specify Product SKUID as a business specific attribute provided by the second retailer).

In some embodiments, the method further includes updating the common data attribute schema to include one or more attributes part of the first plurality of attributes, but not part of the second plurality of attributes. For example, the common data attribute schema may be updated to include an attribute that was not previously present in the common data attribute schema (e.g., a common data attribute schema for an ML task for a first retailer may be updated to include an attribute when being used for an ML task for a second retailer or another business).

In some embodiments, the acts of identifying, using the common data attribute schema and from among a plurality of pre-existing software codes, first software code implementing a first ML data processing pipeline and processing the first group of attribute values with the first software code are performed automatically based on information in the common data attribute schema (e.g., without receiving additional user input for making this identification). For example, the information in the common data attribute schema may aid in mapping groups of attributes to ML data processing pipelines (e.g., as described with respect to FIG. 2C, or any other suitable information) for automatically making the identification.

Figure 6A:
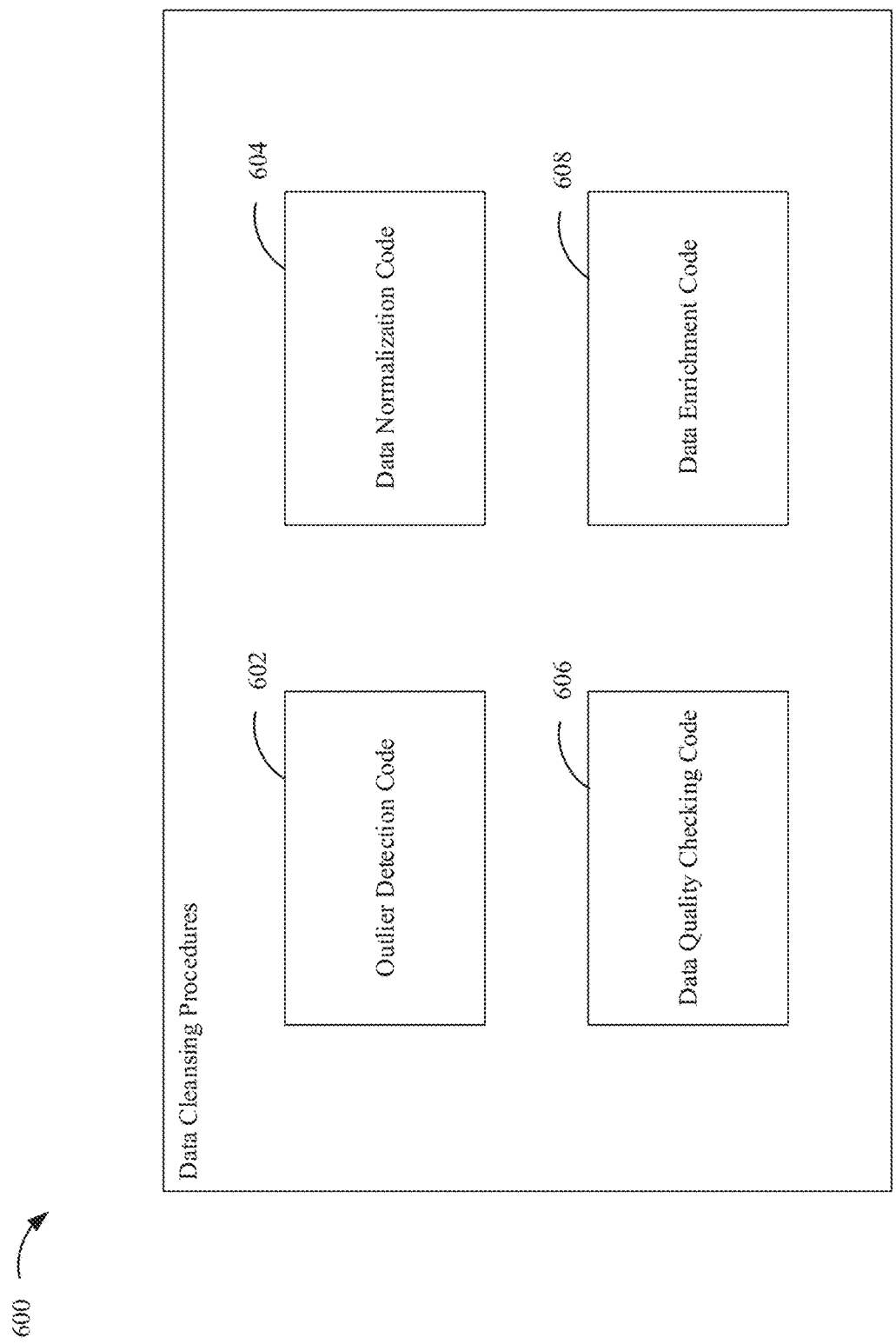
FIG. 6A is a block diagram illustrating data cleansing procedures for a virtualized ML application program, in accordance with some embodiments of the technology described herein.
Figure 6B:
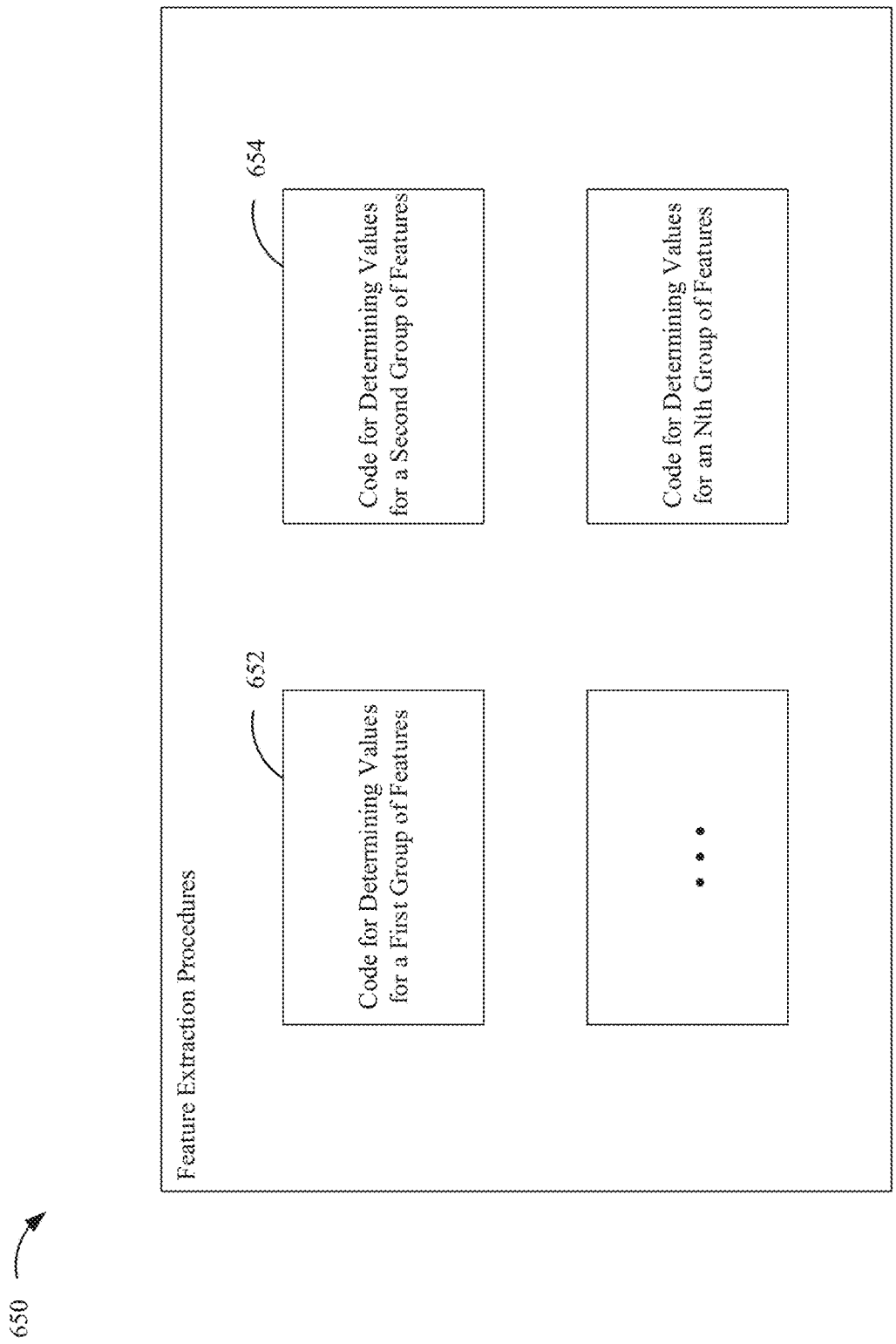
FIG. 6B is a block diagram illustrating feature extraction procedures for a virtualized ML application program, in accordance with some embodiments of the technology described herein.

In some embodiments, the first software code implementing the first ML data processing pipeline is configured to, when executed, generate the first group of feature values from the first group of attribute values using first data cleansing procedures (e.g., outlier detection code, data normalization code, data quality checking code, data enrichment code, any other suitable data cleansing procedures, or no data cleansing procedures where no data cleansing may be required; also described with respect to FIG. 6A) and first feature extraction procedures (e.g., code for determining values for a first group of features, code for determining values for a second group of features, and so on; also described with respect to FIG. 6B).

In some embodiments, the second software code implementing the second ML data processing pipeline is configured to, when executed, generate the second group of feature values from the second group of attribute values using second data cleansing procedures different from the first data cleansing procedures and second feature extraction procedures different from the first feature extraction procedures.

Conventional techniques for deploying ML models involve deploying a trained ML model in a containerized application program, such as a DOCKER container application. However, such conventional deployments include only the trained ML model in the containerized application program. As a result, any steps to update the ML model, to prepare data to provide as input to the ML model, or to monitor performance of the ML model are conventionally performed offline, outside of the containerized application program rather than within it. After performing their offline analysis, the data analyst would re-deploy the ML model in a new containerized application program.

In contrast, the inventors have developed an improved approach where the ML model is deployed in a virtualized application program (e.g., a virtual machine configured to execute an application program, a containerized application program, or any other suitable virtualized application program) that includes not only a trained ML model but also additional software that allows for the deployed ML model to not only be used for inference, but also for training (e.g., re-training from scratch using new data or updating at least some of the already trained parameters using new data), monitoring performance of the ML model, and providing information explaining the performance of the ML model. Importantly, the additional software includes including pre-existing software codes implementing ML data processing pipelines for processing input data to place in condition for using to train the ML model or provide as input to the ML model so that that ML model can perform inference. The inclusion of these additional software in the same containerized application as the ML model itself, allow for all such tasks to be within the containerized application program, without any need for performing offline analysis or re-deploying the ML model in a new containerized application program.

The inventors have developed techniques to deploy a virtualized ML application program (e.g., a virtual machine configured to execute an ML application program, a containerized application program, or any other suitable virtualized application program), including one or more ML data processing pipelines and one or more ML models. Further, because the virtualized ML application program includes the ML data processing pipelines, business data can be provided to the virtualized ML application program without need for external application of data cleansing procedures or feature extraction procedures. The virtualized ML application program can apply the ML data processing pipeline(s) to received data and generate input data for providing as input to the ML model(s) associated with a respective ML task. The virtualized ML application program can include multiple software modules, including software modules to apply one or more ML data processing pipelines, perform inference using one or more ML models, train one or more ML models, generate information explaining performance of the ML model, and/or any other suitable software modules. The developed techniques may involve deploying multiple virtualized ML application programs for different ML tasks (e.g., regression, classification, object detection, business problems such as customer churn probability, customer lifetime value, etc., or any other suitable ML tasks), where each virtualized ML application program may include software modules associated with a particular ML task. In this way, the techniques developed by the inventors improve ML technology by allowing one or more ML data processing pipelines and one or more ML models to be deployed in a virtualized ML application program.

There are various aspects of the techniques developed by the inventors that enable the improvements to ML technology described above. In some aspects, a method for using virtualized ML application programs associated with different ML tasks (e.g., different tasks for one customer, different tasks for different customers, or a suitable combination thereof) includes using a computer hardware processor, which is configured to execute virtualized application programs (e.g., a virtual machine configured to execute an ML application program, such as a VMWARE virtual machine or any other suitable virtual machine; a containerized application program, such as a DOCKER container application or any other suitable containerized application program; or any other suitable virtualized application program), to perform loading a virtualized ML application program including multiple software modules. The multiple software modules include a first software module configured to apply one or more ML data processing pipelines to received data to generate input data (e.g., a group of feature values for a respective group of features, or any other suitable input data) for providing as input to an ML model (e.g., a linear regression model, a non-linear regression model such as neural networks, support vector machines, etc., or any other suitable ML model) associated with a respective ML task. The method further includes using the first software module to: (a) receive data, via at least one communication network, from a source (e.g., a data store, a relational database, an object oriented database, a flat file, Hadoop, or any other suitable source of data) external to the virtualized ML application program; and (b) process the received data using the one or more ML data processing pipelines to generate the input data. The multiple software modules further include a second software module configured to perform inference using the ML model. The method further includes using the second software module to apply the ML model to the input data generated using the first software module to produce corresponding ML model output.

In some embodiments, the multiple software modules include a third software module configured to train the ML model (e.g., initially train or update the ML model). The method further includes using the third software module to train the ML model using the input data.

In some embodiments, the input data includes training data having training inputs and corresponding ground-truth outputs. The ML model includes multiple parameters (e.g., hyperparameters or any other suitable model parameters). The act of using the third software module to train the ML model includes estimating values of at least some of the parameters using the training data (e.g., using a gradient descent algorithm, or any other suitable algorithm).

In some embodiments, the act of estimating values of at least some of the parameters is performed using one or more software libraries (e.g., TENSORFLOW, KERAS, or any other suitable software library) part of the third software module in the virtualized ML application program.

In some embodiments, the multiple software modules include a fourth software module configured to generate information explaining performance of the ML model. The method further includes using the fourth software module to generate information explaining performance of the ML model on the input data. For example, for an ML task for a retailer to predict a customer churn probability (e.g., a probability that the retailer will lose the customer in three months, six months, nine months, or any other suitable time period), the generated information may include input data features ordered by importance, feature sensitivity, or any other suitable information. In another example, for an ML task for a telecom provider to predict a customer churn probability, the generated information may indicate the most important features to be Product Age and Number of Complaints, which may indicate that the customer's device is too old and relatedly the customer has been making frequent complaints of bad reception or call drops. In yet another example, for a telecom provider to predict customer life time value (e.g., how much money the business will make from a customer over a lifetime of the customer-business relationship), the generated information may include predictions for how long a period of time the customer will maintain their relationship and how much the customer will spend on the business's services during this period of time. The spend may be positive, indicating the business will turn a profit over the course of the relationship, or negative, indicating the business will lose money over the course of the relationship.

In some embodiments, the input data includes values for respective features, and the information explaining performance of the ML model on the input data indicates, for at least some of the features, relative degrees to which the at least some of the features influenced the ML model output (e.g., features ordered by importance may be generated using a framework, such as Explainable Artificial Intelligence (XAI), or any other suitable framework). Following from the above example, for a customer churn probability for Customer A predicted to be 0.8 or 80%, the generated information may include features ordered by importance, Account Spend This Year 40%, Account Age 20%, Account Average Annual Spend 10%, and Page View This Year 8%. Similarly, for a customer churn probability for Customer B predicted to be 0.1 or 10%, the generated information may include features ordered by importance, Page View This Year 30%, Peer Group Average Page View This Year 18%, Account Spend This Year 15%, and Account Average Annual Spend 10%.

In some embodiments, the input data includes values for respective features, and the information explaining performance of the ML model on the input data indicates, for each of at least some of the features, a sensitivity of the ML model output to changes in a value of the feature (e.g., feature sensitivity may be generated using a framework, such as Explainable Artificial Intelligence (XAI), or any other suitable framework). Following from the above example, for a customer churn probability for Customer A predicted to be 0.8 or 80%, the generated information may include feature sensitivity, Account Spend This Year −0.1 (which indicates that if the Account Spend This Year feature is higher by 10%, the customer churn probability would be lowered by 1%). Similarly, for a customer churn probability for Customer B predicted to be 0.1 or 10%, the generated information may include feature sensitivity, Page View This Year −0.05 (which indicates that if the Page View This Year feature is higher by 10%, the customer churn probability would be lowered by 0.5%) and Peer Group Average Page View This Year 0.06 (which indicates that if the Peer Group Average Page View This Year feature is higher by 10%, the customer churn probability would be higher by 0.6%).

In some embodiments, the ML model includes a multi-layer neural network configured to detect objects in images, the input data includes an input image, and the information explaining performance of the ML model on the input data includes information explaining performance of the multi-layer neural network on the input image. For example, in the case of a deep learning based object detection task, the input may be a captured image, and the output may be an object type for the input (e.g., car, human, cow, truck, house, or any other suitable object type). In this example, the information explaining performance of the neural network may include an importance of each pixel and feature sensitivity for each color channel of each pixel.

In some embodiments, the information explaining the performance of the multi-layer neural network on the input images includes information indicating, for at least some pixels in the input image, relative degrees to which the at least some of the pixels influenced the ML model output and information indicating, for each of the at least some of the pixels, a sensitivity of the ML model output to changes in a value of the pixel.

In some embodiments, the received data includes attribute values for multiple attributes, the input data includes feature values for multiple features, and one or more ML data processing pipelines are configured to process the received data by applying one or more data cleansing procedures to at least some of the attribute values to obtain cleansed attribute values and applying one or more feature extraction procedures to the cleansed attribute values to obtain the feature values. The attribute value may be scalar, time-series (e.g., vector), imagery (e.g., matrices), or any other suitable value.

In some embodiments, the multiple attributes include groups of attributes including a first group of attributes and a second group of attributes. The attribute values include groups of attribute values including a first group of attribute values for the first group of attributes and a second group of attribute values for the second group of attributes. The multiple features include groups of features including a first group of features and a second group of features. The feature values include groups of feature values including a first group of feature values for the first group of features and a second group of feature values for the second group of features. The ML data processing pipelines include a first ML data processing pipeline to generate the first group of feature values from the first group of attribute values using first data cleansing procedures and first feature extraction procedures. The ML data processing pipelines further include a second ML data processing pipeline to generate the second group of feature values from the second group of attribute values using second data cleansing procedures different from the first data cleansing procedures and second feature extraction procedures different from the first feature extraction procedures.

In some embodiments, the source external to the virtualized ML application program comprises a data store part of a computing system that does not execute the virtualized ML application program. For example, the computing system including the data store may be connected to the virtualized ML application program via a communication network (e.g., the Internet, a local network, or any other suitable communication network) or any other suitable means of communication.

In some embodiments, the method further includes providing, via the at least one communication network, the ML model output to the source external to the virtualized ML application program. For example, the source may be part of a computing system for the business and may process the ML model output to provide information to the business, compare ML model output to ground truth output, or make any other suitable use of the ML model output.

In some embodiments, the first software module comprises processor-executable instructions that, when executed by the computer hardware processor, cause the computer hardware processor to (a) receive the data, via the at least one communication network, from the source external to the virtualized ML application program; and (b) process the received data using the one or more ML data processing pipelines to generate the input data.

In some embodiments, the second software module comprises processor-executable instructions that, when executed by the computer hardware processor, cause the computer hardware processor to apply the ML model to the input data generated using the first software module to produce the corresponding ML model output.

In some embodiments, the computer hardware processor is configured to execute a virtualized application software engine configured to execute multiple different virtualized ML application programs corresponding to different ML tasks. The method further includes executing, with the virtualized application software engine, the multiple different virtualized ML application programs corresponding to the different ML tasks. For example, the virtualized application software engine may execute multiple different virtualized ML application programs corresponding to different ML tasks for the same business, for different businesses, or a suitable combination thereof.

In some embodiments, the virtualized ML application program includes a virtual machine (e.g., a VMWARE virtual machine or any other suitable virtual machine) configured to execute an ML application program comprising the multiple software modules.

In some embodiments, the virtualized ML application program includes a containerized application program (e.g., a DOCKER container application or any other suitable containerized application program) including the multiple software modules.

In some embodiments, the ML model includes a linear regression model or a non-linear regression model (e.g., neural networks, support vector machines, or any other suitable non-linear regression model).

In some embodiments, the ML model includes an ML model configured to map inputs to outputs in a finite set of outputs corresponding to classification labels (e.g., object types detected in an input image, or any other suitable classification labels) or actions (e.g., whether to send a promotional message to a customer, or any other suitable action).

In some embodiments, a value of an attribute may be a single value of any suitable type (e.g., integer, character, real number, Boolean, etc.). However, in some embodiments, a value of an attribute may include multiple numbers (e.g., a time series, a vector of values, an image), multiple characters (e.g., a string or multiple strings), etc. Thus, it should be appreciated that an attribute may have a value of any suitable type, as aspects of the technology described herein are not limited in this respect.

Following below are more detailed descriptions of various concepts related to, and embodiments of, techniques for generating and deploying ML models. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

Figure 2A:
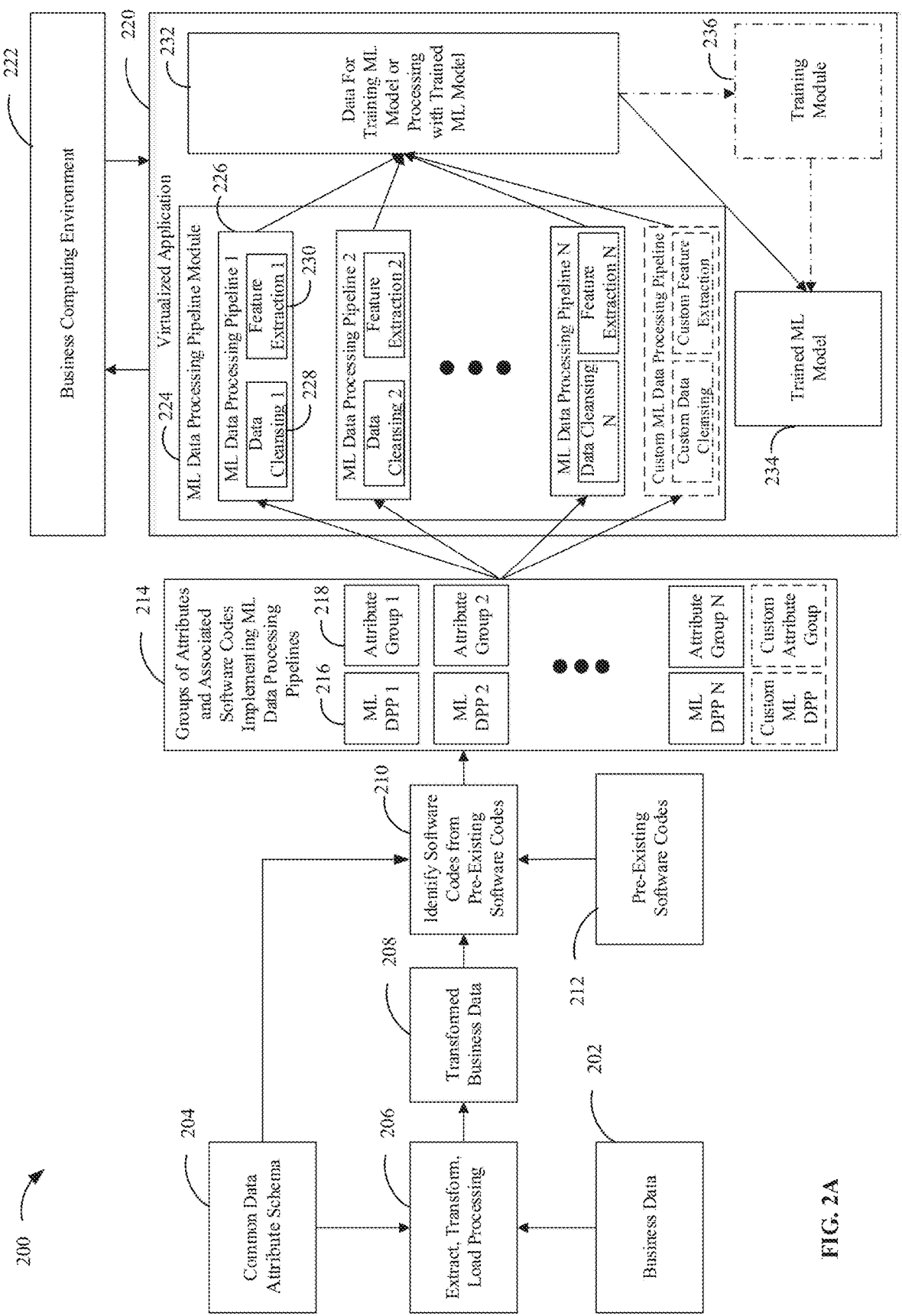
FIGS. 2A-2F are block diagrams illustrating techniques for generating and deploying an ML model in a virtualized ML application program, in accordance with some embodiments of the technology described herein.

FIGS. 2A-2F are block diagrams illustrating techniques for generating and deploying an ML model in a virtualized ML application program. FIG. 2A shows block diagram 200 illustrating techniques that, among other things, identify, for a given ML task, pre-existing software code that implements one or more ML data processing pipelines to allow for rapidly generating and deploying ML models. This identification may be performed based on a common data attribute schema that aids in collecting business data from a business and mapping the business data to one or more software codes from pre-existing software codes for ML data processing pipelines.

Business data 202 may be received from a business (e.g., a retailer, a telecom provider, or any other suitable business). In some embodiments, business data 202 may be received from a source external to virtualized application 220, or any other suitable data source. Business data 202 may include values for one or more attributes (e.g., attributes related to a customer of a retailer, such as Customer ID, Account Open Date, etc., or any other suitable attribute). In some embodiments, a value of an attribute may be a single value of any suitable type (e.g., integer, character, real number, Boolean, etc.). However, in some embodiments, a value of an attribute may include multiple numbers (e.g., a time series, a vector of values, an image), multiple characters (e.g., a string or multiple strings), etc. Thus, it should be appreciated that an attribute may have a value of any suitable type, as aspects of the technology described herein are not limited in this respect.

Common data attribute schema 204 (e.g., as described with respect to FIG. 3, or any other suitable common data attribute schema) may indicate one or more attributes for which attribute values may be generated from business data 202. Common data attribute schema 204 may indicate attributes for which corresponding software codes for ML data processing pipelines (e.g., as described with respect to FIG. 2D, or any other suitable ML data processing pipelines) are stored in pre-existing software codes 212. Extract, Transform, Load (ETL) processing code 206 may be executed to process business data 202 in accordance with common data attribute schema 204 and store the results as transformed business data 208. ETL processing code 206 may include software code for processing attribute values according to a specified format, or any other suitable structure for storing the values. For example, for an attribute Account Open Date, ETL processing code 206 may transform a corresponding attribute value to be in MM-DD-YYYY format and store the transformed value in transformed business data 208. Software code for ETL processing code 206 may be provided by the business, a data analyst, or any other suitable entity. Identify software codes 210 may be executed to identify, using common data attribute schema 204 and from among pre-existing software codes 212, groups of attributes 218 and associated software codes 216 for ML data processing pipelines 226 (e.g., attribute group 1 and ML data processing pipeline 1, attribute group 2 and ML data processing pipeline 2, and so on). This mapping information 214 may be used to provide transformed business data 208 to virtualized application 220.

Figure 12:
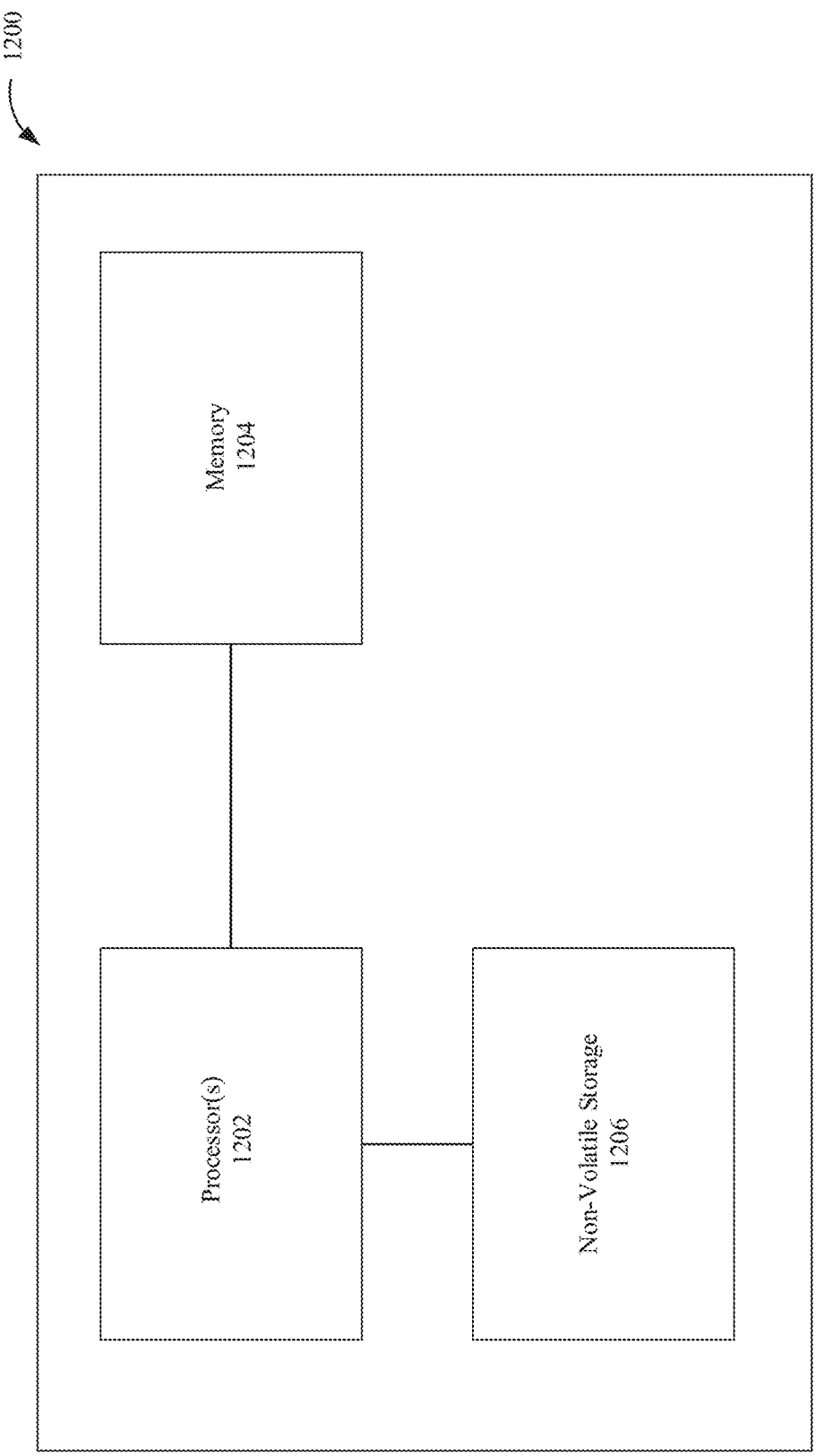
FIG. 12 schematically illustrates components of a computer that may be used to implement some embodiments of the technology described herein.

Virtualized application 220 may include a virtualized ML application program executing using at least one processor (e.g., processor 1202 shown in computing system 1200 of FIG. 12, or any other suitable processor). In some embodiments, a virtualized application program may be any application program configured to execute on a virtual machine (e.g., a VMWARE virtual machine, an AZURE virtual machine, etc.). In some embodiments, a virtualized application program may be a containerized application program configured to execute in a container such as a DOCKER container, a MOBY container, etc. Further details for virtualized ML application programs are described with respect to FIGS. 5A-5B.

Virtualized application 220 may include ML data processing pipeline module 224 for processing transformed business data 208. In some embodiments, software code for an ML data processing pipeline may include data cleansing procedures, feature extraction procedures, and/or any other code for processing data to be provided for training an ML model or processed with a trained ML model. ML data processing pipeline module 224 may include software code for ML data processing pipeline 226, which may include data cleansing procedures 228 and feature extraction procedures 230. Data cleansing procedures 228 may include outlier detection code, data normalization code, data quality checking code, data enrichment code, and/or any other suitable code. Feature extraction procedures 230 may include code for determining values for one or more groups of features. ML data processing pipeline module 224 may include software code for multiple ML data processing pipelines for processing values from corresponding groups of attributes. In some embodiments, software code for each ML data processing pipeline may include data cleansing procedures and feature extraction procedures suited to the values from the group of attributes corresponding to the ML data processing pipeline. Further details for data cleansing procedures 228 and feature extraction procedures 230 are described with respect to FIGS. 6A and 6B, respectively.

For example, software code for ML data processing pipeline 226 may process attribute values from attribute group 1 (218) and generate feature values to be provided as input data 232 for training an ML model or processing with a trained ML model. Input data 232 may be provided as input to trained ML model 234 (deployed within virtualized application 220) for generating corresponding ML model outputs. Additionally or alternatively, input data 232 may be provided to training module 236 in order to train ML model 234 (e.g., to initially train ML model 234 or to update trained ML model 234). In some embodiments, training module 236 may not be included in virtualized application 220. For example, training module 236 may be present at a computing system external to virtualized application 220 and in communication with virtualized application 220 via a communication network (e.g., the Internet, a local network, or any other suitable communication network), or any other suitable computing system.

In some embodiments, ML data processing pipeline module 224 may include a custom ML data processing pipeline, including custom data cleansing procedures and custom feature extraction procedures. The software code for the custom ML data processing pipeline may be added for a new attribute (or attributes) in business data 202. For example, a new attribute may be an attribute that was not present in common data attribute schema 204 until business data 202 was provided. Common data attribute schema 204 may be updated to include the new attribute. Identify software codes 210 may identify, using common data attribute schema 204, a custom attribute group (including the new attribute) and associated software code for the custom ML data processing pipeline.

Virtualized application 220 may be in communication with business computing environment 222, e.g., via a communication network (e.g., the Internet, a local network, or any other suitable communication network) or any other suitable means of communication. In some embodiments, business computing environment 222 may be located at the premises of the business that provided business data 202, on a cloud server, or be otherwise accessible to the business. In some embodiments, virtualized application 220 may provide information to business computing environment 222. For example, virtualized application 220 may provide output from trained ML model 234 and optionally provide information explaining the ML output. For example, for an ML task for a telecom provider to predict a customer churn probability, the ML output may indicate a high customer churn probability and the generated information may indicate the most important features to be Product Age and Number of Complaints (e.g., which may indicate that the customer's device is too old and relatedly the customer has been making frequent complaints of bad reception or call drops, which may help explain the high customer churn probability).

In some embodiments, business computing environment 222 may provide information to virtualized application 220. For example, business computing environment 222 may provide new data to virtualized application 220. The new data may provide ground truth outputs for previous inputs on which trained ML model 234 was applied to generate ML outputs. Additionally or alternatively, the new data may include additional training data from recent customers to which trained ML model 234 has not yet been applied. The new data may be used to monitor performance of trained ML model 234 and update the ML model if the model performance is below a specified threshold. For example, if the model's accuracy for the ML output falls below a specified threshold, virtualized application 220 may update trained ML model 234 using prior training data and/or the new data. Additionally or alternatively, virtualized application 220 may update trained ML model 234 on a periodic basis (e.g., every week, every month, every two months, or any other suitable interval). Additionally or alternatively, virtualized application 220 may update trained ML model 234 when a threshold amount of new data is available (e.g., 20% of the size of the training data initially used to generate trained ML model 234, 50% of the size of the training data initially used to generate trained ML model 234, or any other suitable threshold).

Figure 2B:
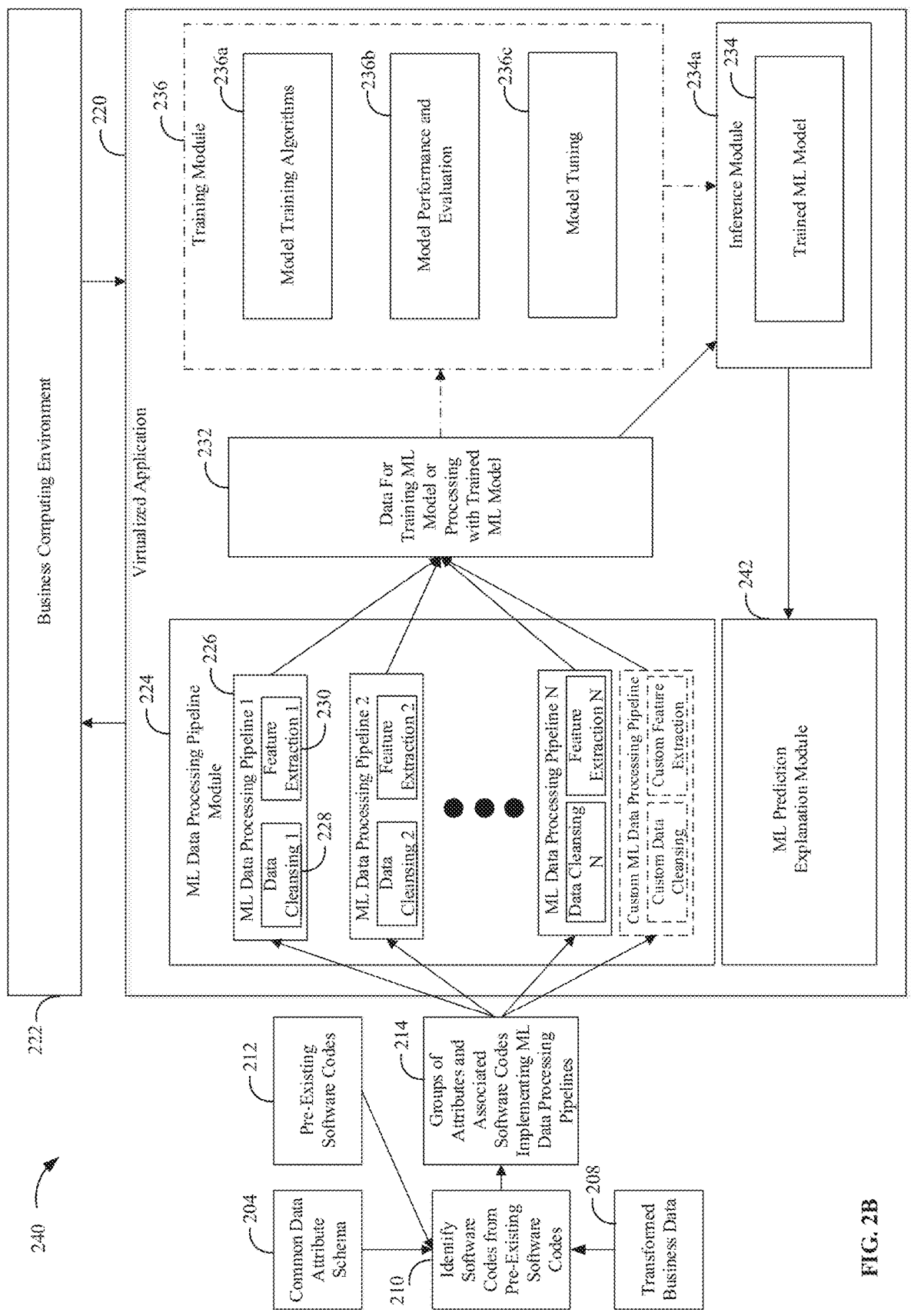

FIG. 2B shows block diagram 240 illustrating further details for training module 236 and ML prediction explanation module 242 included in virtualized application 220. Input data 232 may be provided as input to trained ML model 234 in inference module 234a (deployed within virtualized application 220) for generating corresponding ML model output. The ML model output may be provided to ML prediction explanation module 242 to generate information explaining the ML output.

For example, for an ML task for a retailer to predict a customer churn probability (e.g., a probability that the retailer will lose the customer in three months, six months, nine months, or any other suitable time period), ML prediction explanation module 242 may generate information including input data features ordered by importance, feature sensitivity, or any other suitable information. In another example, for an ML task for a telecom provider to predict a customer churn probability, ML prediction explanation module 242 may generate information indicating the most important features to be Product Age and Number of Complaints, which may indicate that the customer's device is too old and relatedly the customer has been making frequent complaints of bad reception or call drops. In yet another example, for a telecom provider to predict customer life time value (e.g., how much money the business will make from a customer over a lifetime of the customer-business relationship), ML prediction explanation module 242 may generate information including predictions for how long a period of time the customer will maintain their relationship and how much the customer will spend on the business's services during this period of time. The spend may be positive, indicating the business will turn a profit over the course of the relationship, or negative, indicating the business will lose money over the course of the relationship.

Additionally or alternatively, the input data may be provided to training module 236 for training an ML model. Training module 236 may include model training algorithms 236a for training the ML model (e.g., a linear regression model, a non-linear regression model such as neural networks, support vector machines, etc., or any other suitable ML model). Training module 236 may further include model performance and evaluation code 236b and model tuning code 236c for assessing and improving performance of the trained ML model (e.g., to achieve model performance below a certain error threshold, or any other suitable target).

Figure 2C:
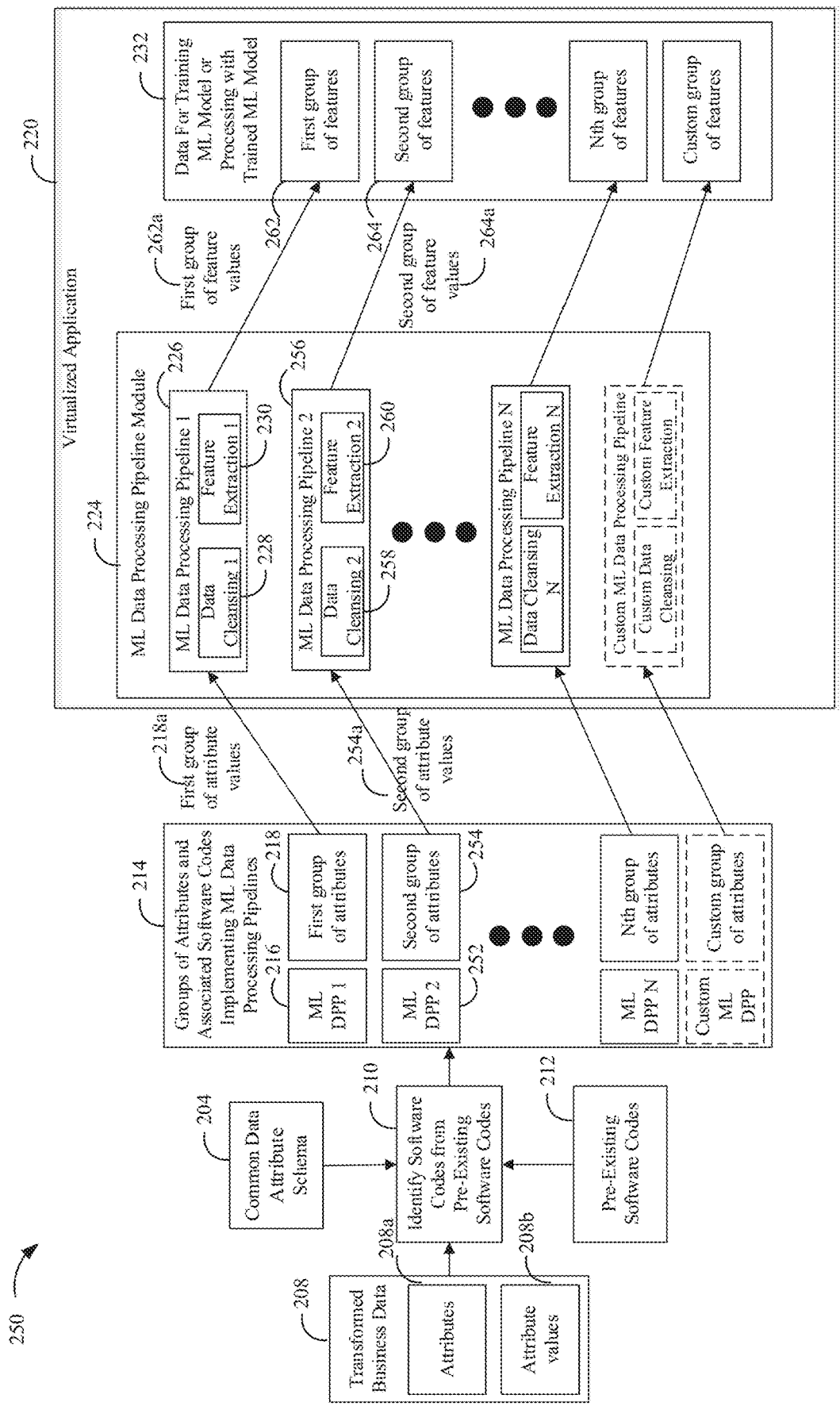

FIG. 2C shows block diagram 250 illustrating further details for when ML data processing pipeline module 224 is applied to transformed business data 208 (including attribute values 208b for attributes 208a). As described above, identify software codes 210 may be executed to identify, using common data attribute schema 204 and from among pre-existing software codes 212, groups of attributes 218, 254 and associated software codes 216, 252 for ML data processing pipelines 226, 256, to generate groups of feature values 262a, 264a, for respective groups of features 262, 264, from groups of attribute values 218a, 254a. The groups of attributes may include first group of attributes 218 and second group of attributes 254. The groups of attribute values may include first group of attribute values 218a for first group of attributes 218 and second group of attribute values 254a for second group of attributes 254. The groups of features may include first group of features 262 and second group of features 264. The groups of feature values may include first group of feature values 262a for first group of features 262 and second group of feature values 264a for second group of features 264. The ML data processing pipelines include ML data processing pipeline 226, to generate first group of feature values 262a from first group of attribute values 218a using data cleansing procedures 228 and feature extraction procedures 230, and ML data processing pipeline 256 to generate second group of feature values 264a from second group of attribute values 254a using data cleansing procedures 258 different from data cleansing procedures 228 and feature extraction procedures 260 different from feature extraction procedures 230.

Figure 2D:
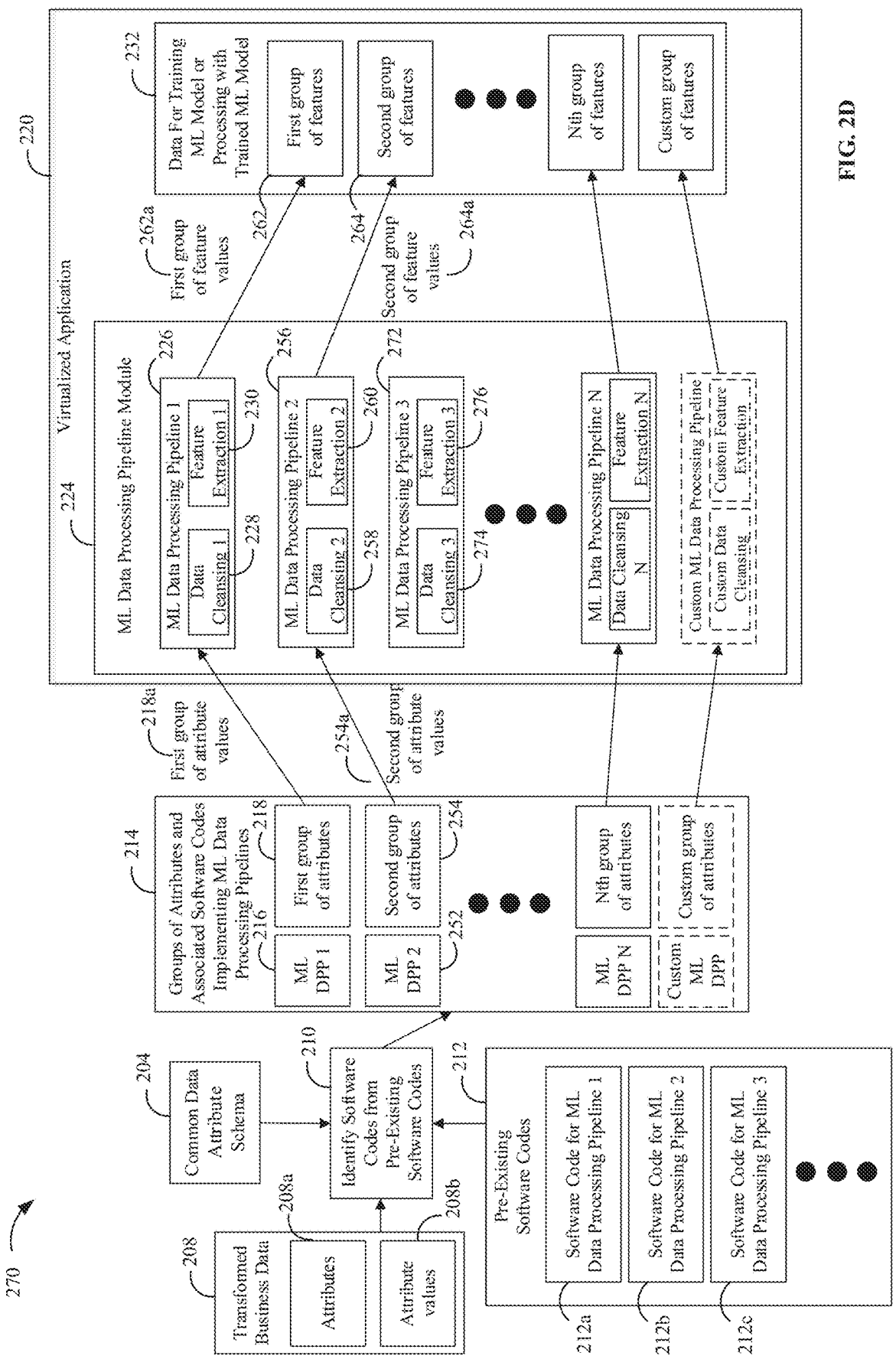

FIG. 2D shows block diagram 270 illustrating that ML data processing pipeline module 224 may include ML data processing pipeline 272 (including data cleansing procedures 274 and feature extraction procedures 276) that is not applied to any group of attributes. Pre-existing software codes 212 may include software code 212a for ML data processing pipeline 1, software code 212b for ML data processing pipeline 2, software code 212c for ML data processing pipeline 3, and/or software code for any other suitable ML data processing pipeline. Virtualized application 220 may be deployed to include software code for at least some ML data processing pipelines that may not be used in some instances. For example, software code 212c for ML data processing pipeline 3 is deployed in virtualized application 220 but does not have a corresponding group of attributes in transformed business data 208. Such an implementation for virtualized application 220 may be advantageous. For example, if business data provided at a later time were to include attributes relevant to software code 212c for ML data processing pipeline 3, these attributes may be mapped to software code 212c and processed using ML data processing pipeline 3 without need for deploying a new virtualized application. Such an implementation may allow for rapid deployment of new virtualized applications without need for assessing beforehand which software codes for ML data processing pipelines should be included in the virtualized application.

Figure 2E:
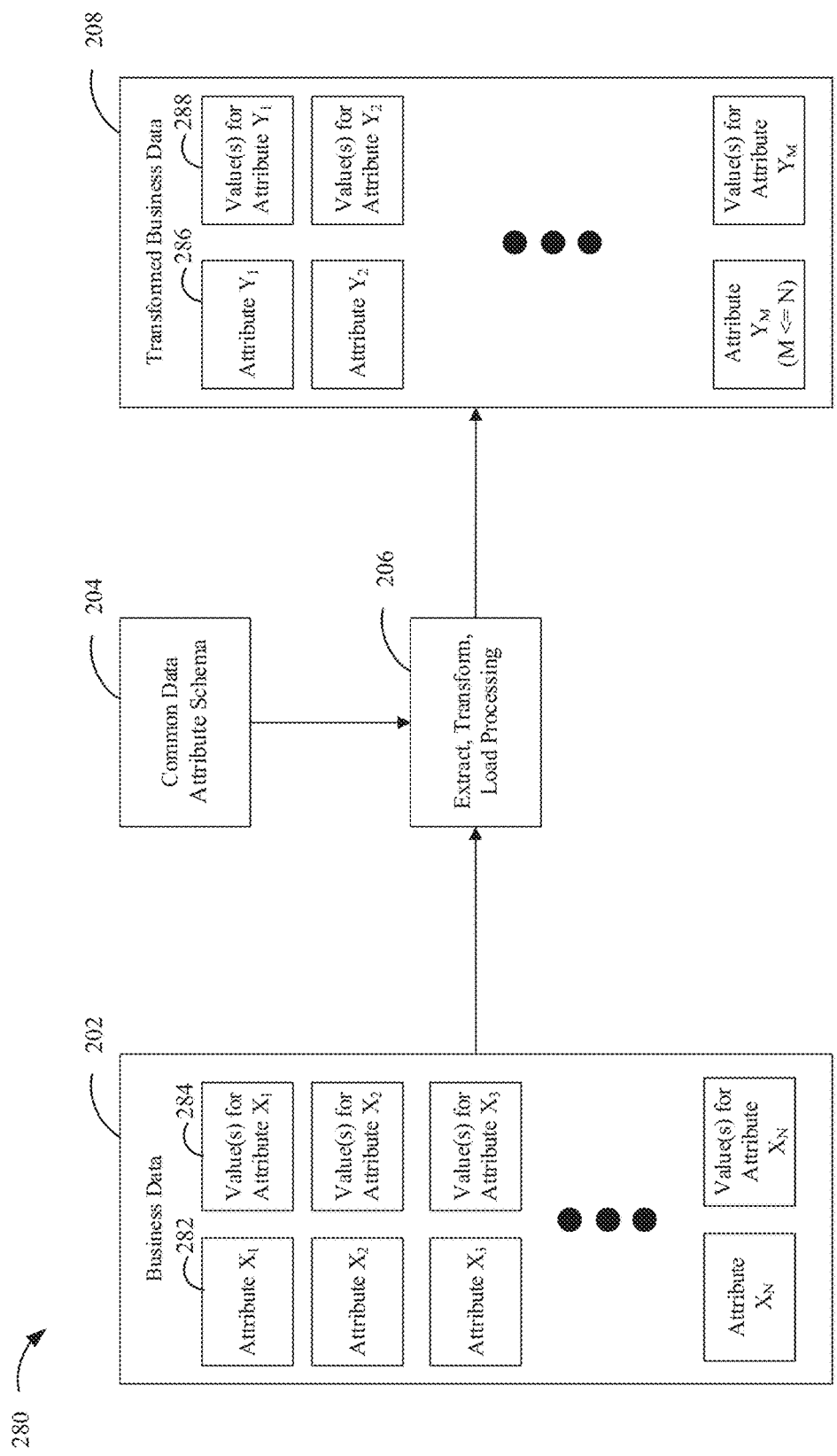

FIG. 2E shows block diagram 280 illustrating further details for when business data 202 is processed in accordance with common data attribute schema 204 to generate transformed business data 208. Business data 202 may include values 284 for multiple attributes 282: $X_1$, $X_2, \ldots, X_N$. ETL processing code 206 may process business data 202 in accordance with common data attribute schema 204 to generate transformed business data 208. Transformed business data 208 may include values 288 for multiple attributes 286: $Y_1, Y_2, \ldots, Y_N$ (M<=N). Common data attribute schema 204 may indicate attributes for which corresponding software codes for ML data processing pipelines are stored in pre-existing software codes 212. It is appreciated that in some embodiments not all attributes $X_i$ present in business data 202 may be included in common data attribute schema 204. Accordingly, values for attributes $Y_i$ selected for transformed business data 208 may be fewer in number than values for attributes $X_i$ present in business data 202. In some embodiments, common data attribute schema 204 may indicate a format for attribute values. For example, the format may include an ordering of the attributes, a file format (e.g., comma-separated values, EXCEL spreadsheet, etc.), or any other suitable format. It is appreciated that in some embodiments values for attributes $Y_i$ selected for transformed business data 208 may not be in the same order as the corresponding values for attributes $X_i$ present in business data 202. Instead, the attributes values may be ordered as specified by common data attribute schema 204.

Figure 2F:
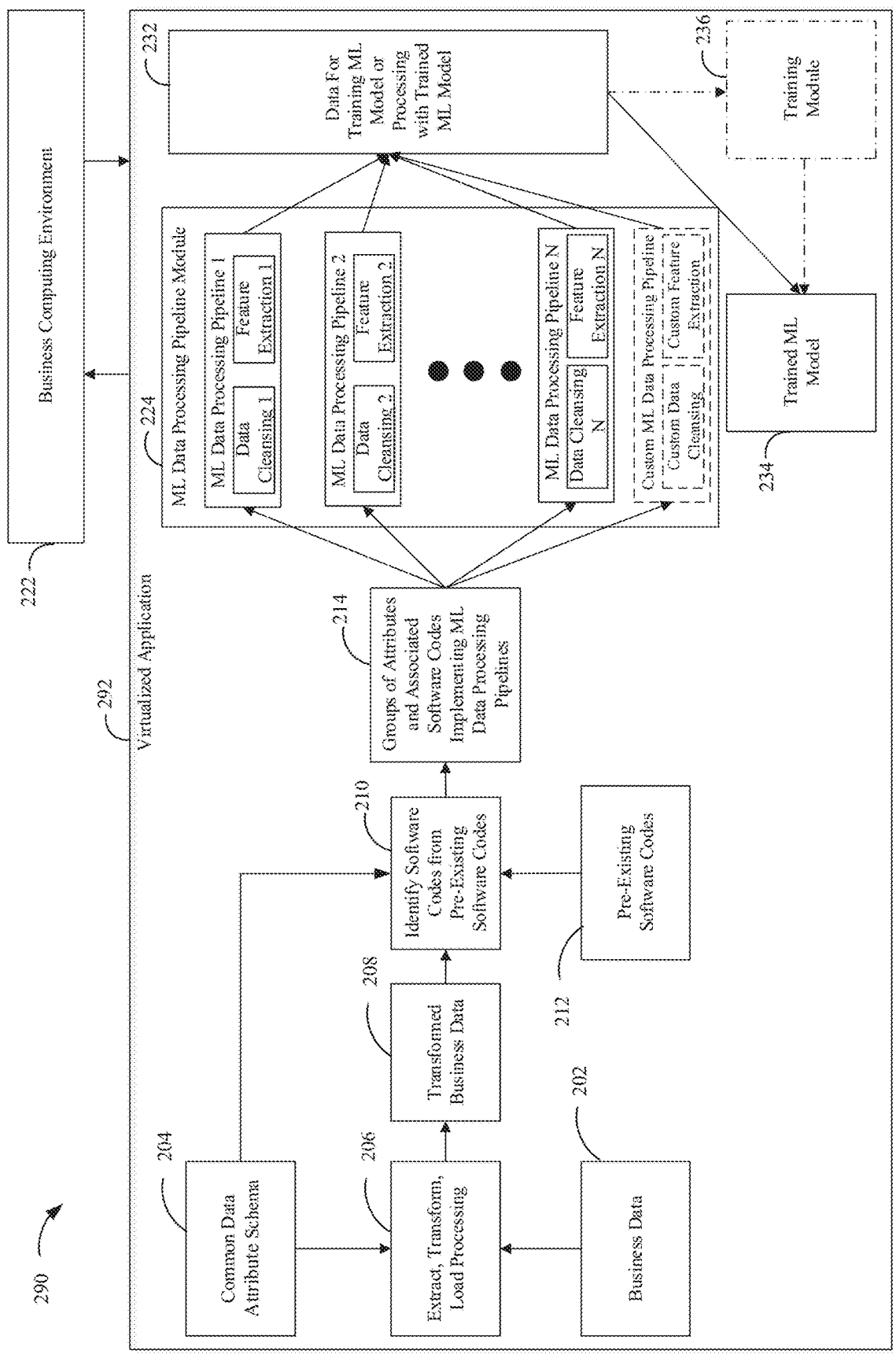

FIG. 2F shows block diagram 290 illustrating another virtualized application 292 that includes business data 202 and related data processing functionality in addition to the functionality described with respect to virtualized application 220. In some embodiments, any suitable portion of the components shown in virtualized application 292 may be included within virtualized application 292 or be present at a computing system external to virtualized application 292. Thus, it should be appreciated that any such variations are within the scope of the techniques described herein and aspects of the technology described herein are not limited in this respect.

Figure 3:
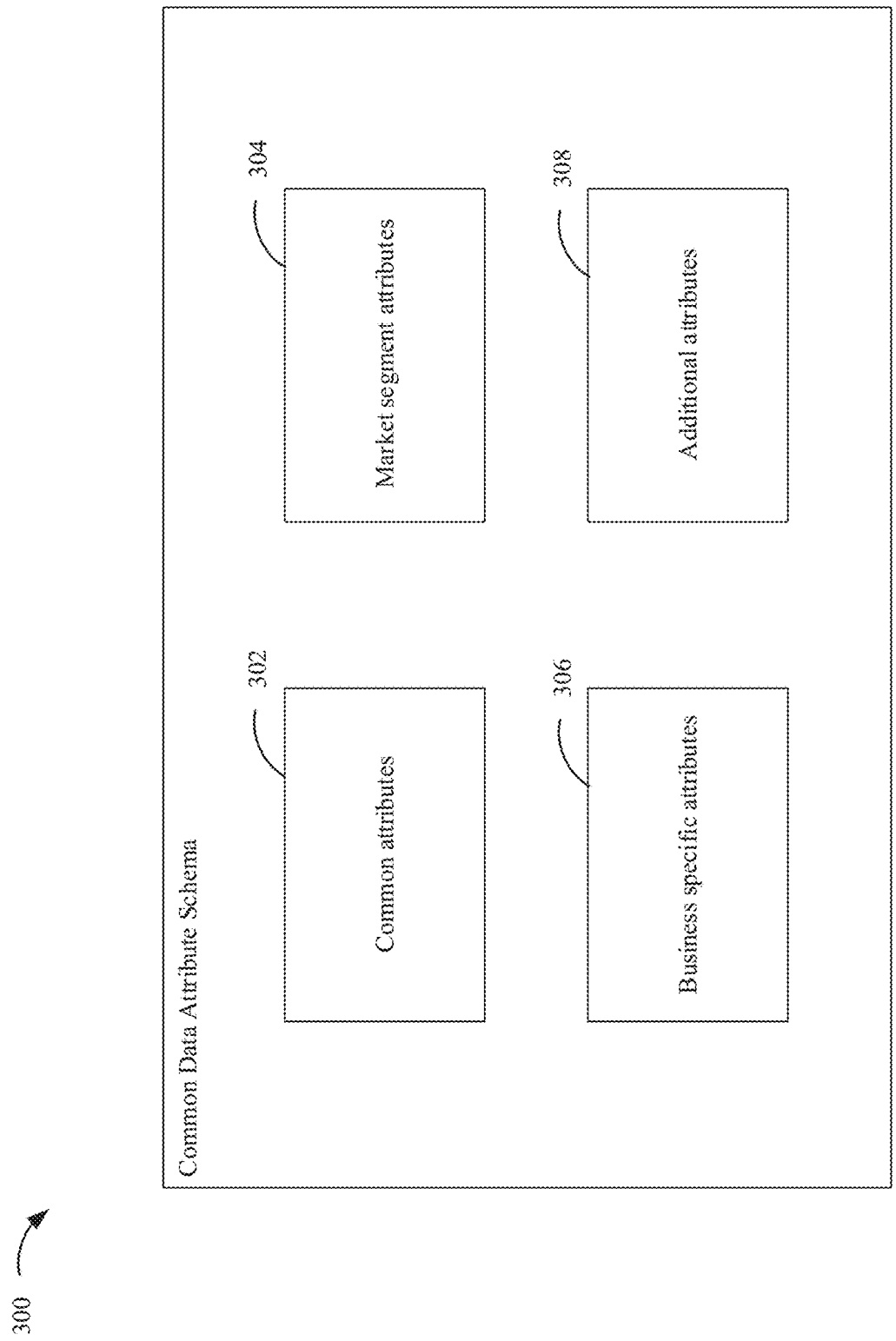
FIG. 3 is a block diagram illustrating a common data attribute schema used for generating and deploying an ML model in a virtualized ML application program, in accordance with some embodiments of the technology described herein.

FIG. 3 is a block diagram illustrating common data attribute schema 300 used for generating and deploying an ML model in a virtualized ML application program (e.g., virtualized application 220 in FIG. 2A, or any other suitable virtualized ML application program). The common data attribute schema may be defined as a collection of one or more attributes. For example, the common data attribute schema may be a list of attributes for data that may be collected from a business. The common data attribute schema may indicate a format for attribute values. For example, the format may include an ordering of the attributes, a file format (e.g., comma-separated values, EXCEL spreadsheet, etc.), or any other suitable format. The common data attribute schema may be used to map data received from the business to one or more software codes from pre-existing software codes for ML data processing pipelines. The received data may be automatically processed with the identified software code(s) to generate input data for training an ML model and/or using the ML model for inference.

Common data attribute schema 300 categorizes attributes into multiple categories, such as common attribute category 302, market segment attribute category 304, business specific attribute category 306, and/or any other suitable attribute category, such as additional attribute category 308. For example, a common data attribute schema for an ML task for a retailer may specify Customer ID as a common attribute, and a common data attribute schema for an ML task for a telecom provider may also specify Customer ID as a common attribute, where each of the retailer and the telecom provider can provide this attribute. In another example, the common data attribute schema for an ML task for a retailer may specify Product Purchased as a market segment attribute provided by the retailer, while the common data attribute schema for an ML task for a telecom provider may specify Service Subscribed as a market segment attribute provided by the telecom provider. In yet another example, the common data attribute schema for an ML task for a first retailer may specify Product Model as a business specific attribute provided by the first retailer, while the common data attribute schema for an ML task for a second retailer may specify Product SKUID as a business specific attribute provided by the second retailer. In yet another example, the common data attribute schema for an ML task for a second retailer may specify a new attribute without a corresponding ML data processing pipeline as an additional attribute. After software code for the corresponding ML data processing pipeline is provided, the new attribute may be reclassified as a common attribute, a market segment attribute, or a business specific attribute. In some embodiments, common data attribute schema 300 may be updated to include an attribute that was not previously present in common data attribute schema 300 (e.g., a common data attribute schema for an ML task for a first retailer may be updated to include an attribute when being used for an ML task for a second retailer or another business).

FIG. 4 is a block diagram illustrating common data attribute schema 400 used for generating and deploying an ML model in a virtualized ML application program (e.g., virtualized application 220 in FIG. 2A, or any other suitable virtualized ML application program). Common data attribute schema 400 categorizes attributes into multiple categories, such as common attribute category 402, market segment attribute category 404, business specific attribute category 406, and/or any other suitable attribute category, such as additional attribute category 408. Further, common data attribute schema 400 indicates which attributes are mandatory or optional. In some embodiments, mandatory attributes may be required in order for the data to be processed by an ML data processing pipeline and may require the processor to generate an error notification when values are missing for one or more mandatory attributes (e.g., common data attribute schema 400 specifies Customer ID as a common attribute that is mandatory). For example, the processor may perform these acts as part of a data quality check in order to ensure that values for mandatory attributes are available from the business. In some embodiments, optional attributes may not be required in order for the data to be processed by an ML data processing pipeline. The processor may ignore the optional attribute, replace a value for the optional attribute with average value, a default value, or any other suitable value for the optional attribute, or otherwise address the missing value for the optional attribute without generating an error notification (e.g., common data attribute schema 400 specifies Credit Score as a common attribute that is optional).

Figure 5A:
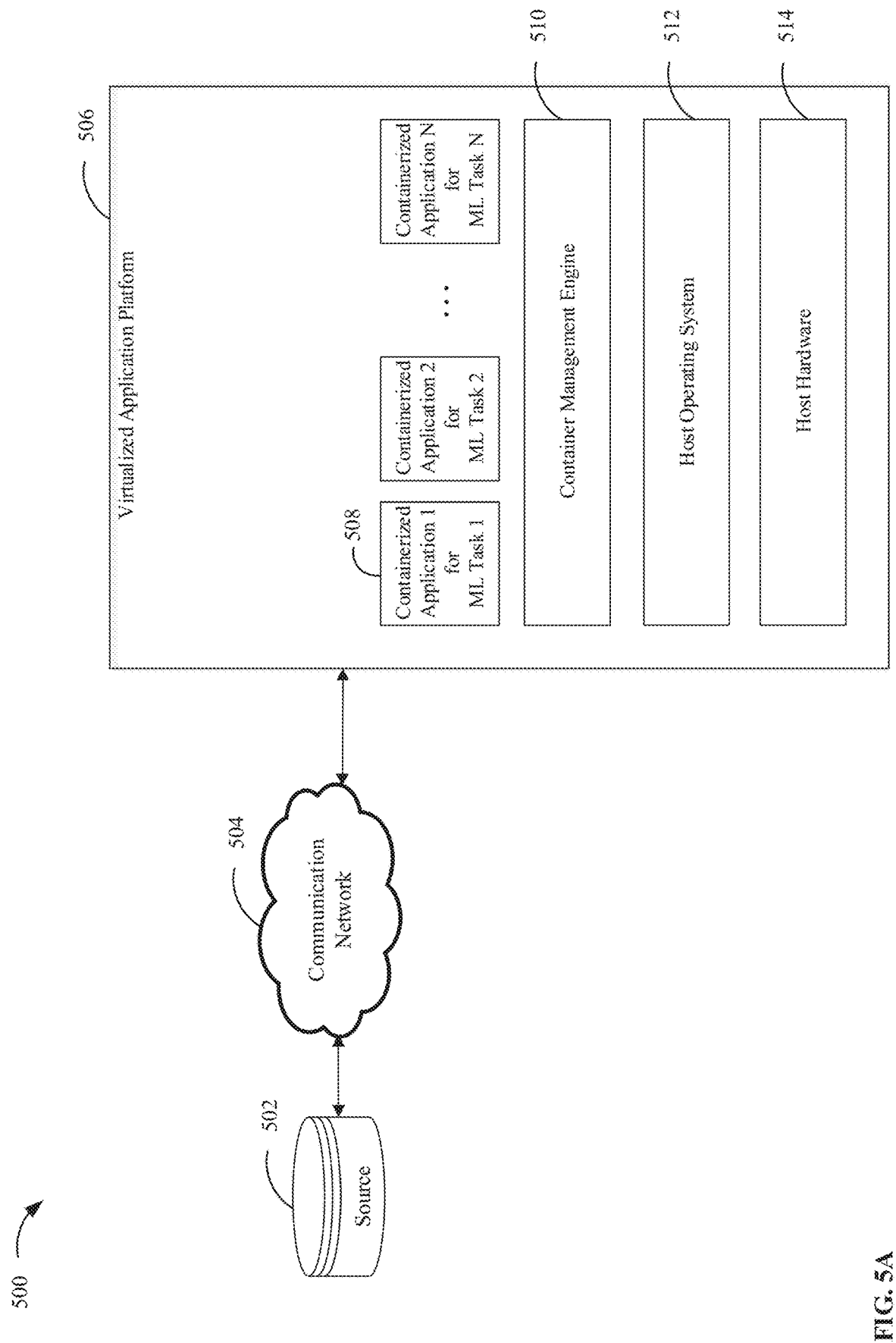
FIGS. 5A-5B are block diagrams illustrating embodiments of a virtualized ML application program, in accordance with some embodiments of the technology described herein.

FIG. 5A shows block diagram 500 illustrating a virtualized application platform 506 including containerized application programs 508 for different ML tasks. For example, containerized application programs 508 may be configured to execute in corresponding containers, such as DOCKER containers, MOBY containers, etc. Virtualized application platform 506 may be configured to receive data from a source 502 (e.g., a data store, a relational database, an object oriented database, a flat file, Hadoop, or any other suitable source of data) external to virtualized application platform 506 via communication network 504 (e.g., the Internet, a local network, or any other suitable communication network). Virtualized application platform 506 may be configured to execute virtualized application 220 (shown in FIG. 2A) or any other suitable virtualized ML application program. Source 502 external to virtualized application platform 506 may include a data store that is part of a computing system that does not execute containerized application programs 508.

In some embodiments, each of containerized application programs 508 is abstracted at the application layer and may package together software code for an application for an ML task and optional dependencies (e.g., shared libraries, etc.). Because the containerized application program isolates the software code from its environment, the containerized application program may be executed in a uniform manner across multiple environments despite differences between underlying host hardware 514 or host operating system 512. Multiple containerized application programs 508 may be executed as isolated processes managed by container management engine 510 but running on the same host hardware 514 and sharing the same host operating system 512. In some embodiments, container management engine 510 is software that may be configured to execute multiple containerized application programs 508 corresponding to different ML tasks. For example, virtualized application platform 506 may be configured to execute multiple containerized application programs 508 corresponding to different ML tasks for the same business, for different businesses, or a suitable combination thereof.

Figure 5B:
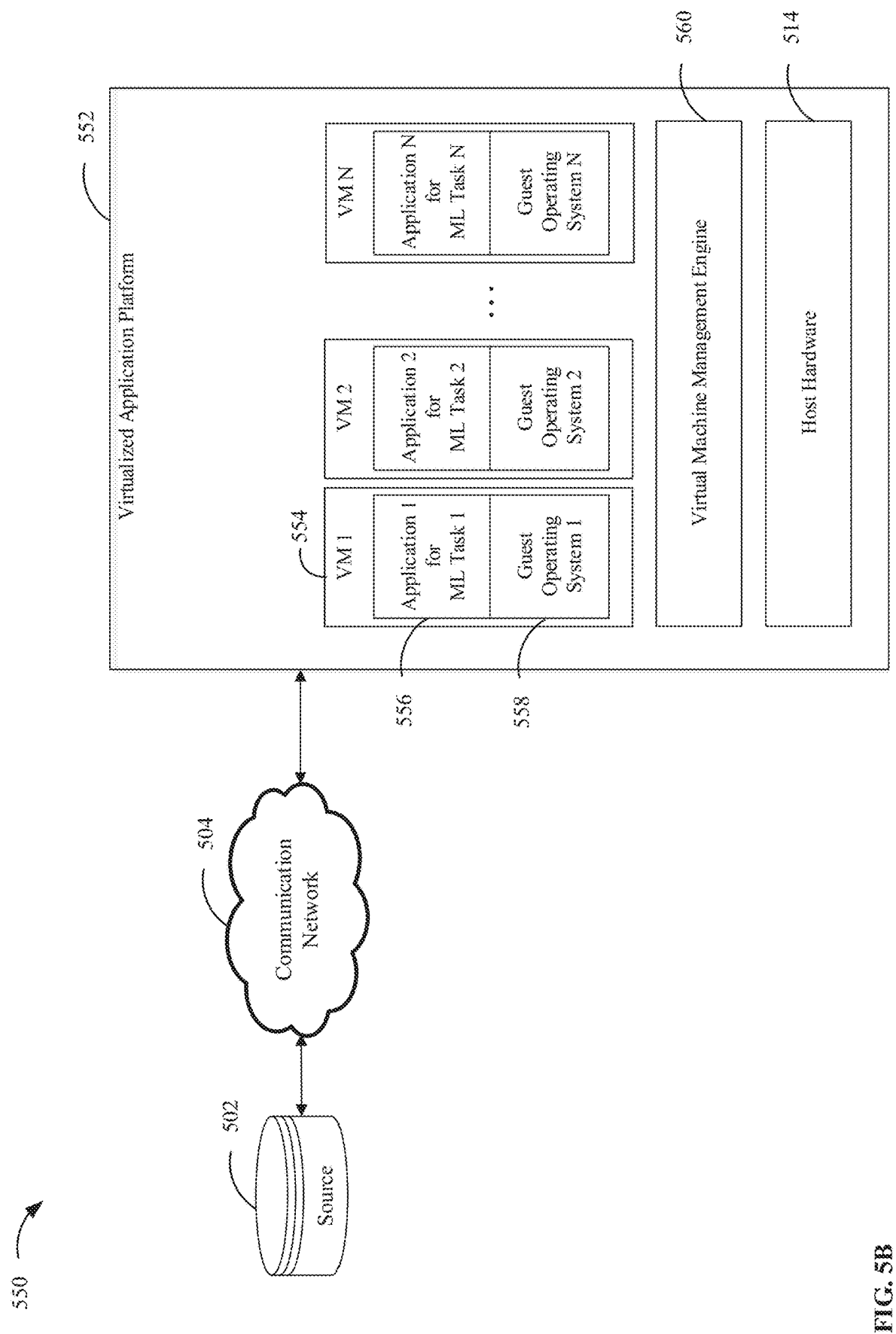

FIG. 5B shows a block diagram 550 illustrating virtualized application platform 552 including application programs 556 for different ML tasks being executed on corresponding virtual machines 554 (e.g., VMWARE virtual machines, AZURE virtual machines, etc.). Virtualized application platform 552 may be configured to receive data from a source 502 (e.g., a data store, a relational database, an object oriented database, a flat file, Hadoop, or any other suitable source of data) external to virtualized application platform 552 via communication network 504 (e.g., the Internet, a local network, or any other suitable communication network). Virtualized application platform 552 may be configured to execute virtualized application 220 (shown in FIG. 2A) or any other suitable virtualized ML application program. Source 502 external to virtualized application platform 552 may include a data store that is part of a computing system that does not execute virtual machines 554 or application programs 556.

In some embodiments, application programs 556 execute on corresponding virtual machines 554 and guest operating systems 558. Virtual machines 554 are abstractions of physical hardware and may be used to emulate multiple pieces of hardware on the same host hardware 514. Virtual machine management engine 560 is software or hardware that may create and manage one or more virtual machines to run on host hardware 514. Each virtual machine may include a corresponding application program, optional dependencies (e.g., shared libraries, etc.), and its own copy of the guest operating system. Multiple application programs 556 may be executed within virtual machines 554 (with corresponding guest operating systems 558) and managed by virtual machine management engine 560 but running on the same host hardware 514. In some embodiments, virtual machine management engine 560 may be configured to execute multiple virtual machines 554 with application programs 556 corresponding to different ML tasks. For example, virtualized application platform 552 may be configured to execute multiple virtual machines 554 with application programs 556 corresponding to different ML tasks for the same business, for different businesses, or a suitable combination thereof.

FIG. 6A is a block diagram illustrating data cleansing procedures 600 for a virtualized ML application program (e.g., virtualized application 220 in FIG. 2A, or any other suitable virtualized ML application program). Software code implementing an ML data processing pipeline (e.g., ML data processing pipeline 226 in FIG. 2A) may be configured to, when executed, process a group of attribute values using data cleansing procedures, including outlier detection code 602, data normalization code 604, data quality checking code 606, data enrichment code 608, any other suitable data cleansing procedures, or no data cleansing procedures where no data cleansing may be required.

In some embodiments, outlier detection code 602 may process the group of attribute values to identify extreme values that deviate from other observations on data, which may indicate a variability in a measurement, experimental errors, or a novelty. Outlier detection code 602 may implement one or more methods for outlier detection including z-score or extreme value analysis, probabilistic and statistical modeling, linear regression models, proximity based models, information theory models, high dimensional outlier detection methods, and/or any other suitable outlier detection method.

In some embodiments, data normalization code 604 may process the group of attribute values to transform the values in a way that they are either dimensionless and/or have similar distribution. Data normalization code 604 may implement one or more methods for data normalization including min-max normalization, mean normalization, z-score normalization, and/or any other suitable data normalization method.

In some embodiments, data quality checking code 606 may process the group of attribute values to determine whether a value is missing for an attribute identified as mandatory in the common data attribute schema. For example, data quality checking code 606 may generate an error notification when the group of attribute values does not include a value for a mandatory attribute. This data quality check may be performed in order to ensure that values for mandatory attributes are available from the business. Such missing values may impact the accuracy of the trained ML model, or worse, prevent initial training of the ML model.

In some embodiments, data enrichment code 608 may process the group of attribute values to identify missing or incomplete values and enhance existing information by supplementing missing or incomplete values. For example, data enrichment code 608 may replace a missing value for an optional attribute with an average value for the attribute (e.g., missing value for a Customer Age attribute may be replaced with an average value), a default value (e.g., missing value for a ZIP code attribute may be replaced with 00000 or another default value), or any other suitable value. In another example, data enrichment code 608 may identify a missing value from the value for another attribute, e.g., for missing value for attribute Customer Age, data enrichment code 608 may determine the customer's age from a value for a Date Of Birth attribute for the customer.

FIG. 6B is a block diagram illustrating feature extraction procedures 650 for a virtualized ML application program. Software code implementing an ML data processing pipeline (e.g., ML data processing pipeline 226 in FIG. 2A) may be configured to, when executed, process a group of attribute values using feature extraction procedures (e.g., code for determining values for a first group of features 652, code for determining values for a second group of features 654, and so on) to generate a group of feature values. For example, the group of attribute values may include a value for attribute, Account Open Date, for a customer of a retailer business. The group of features may include Account Age, Account Open Year, Account Open Month, Days To Next Renewal, or any other suitable feature. Code for determining values for the group of features may determine these feature values based on the value for attribute, Account Open Date.

Figure 7:
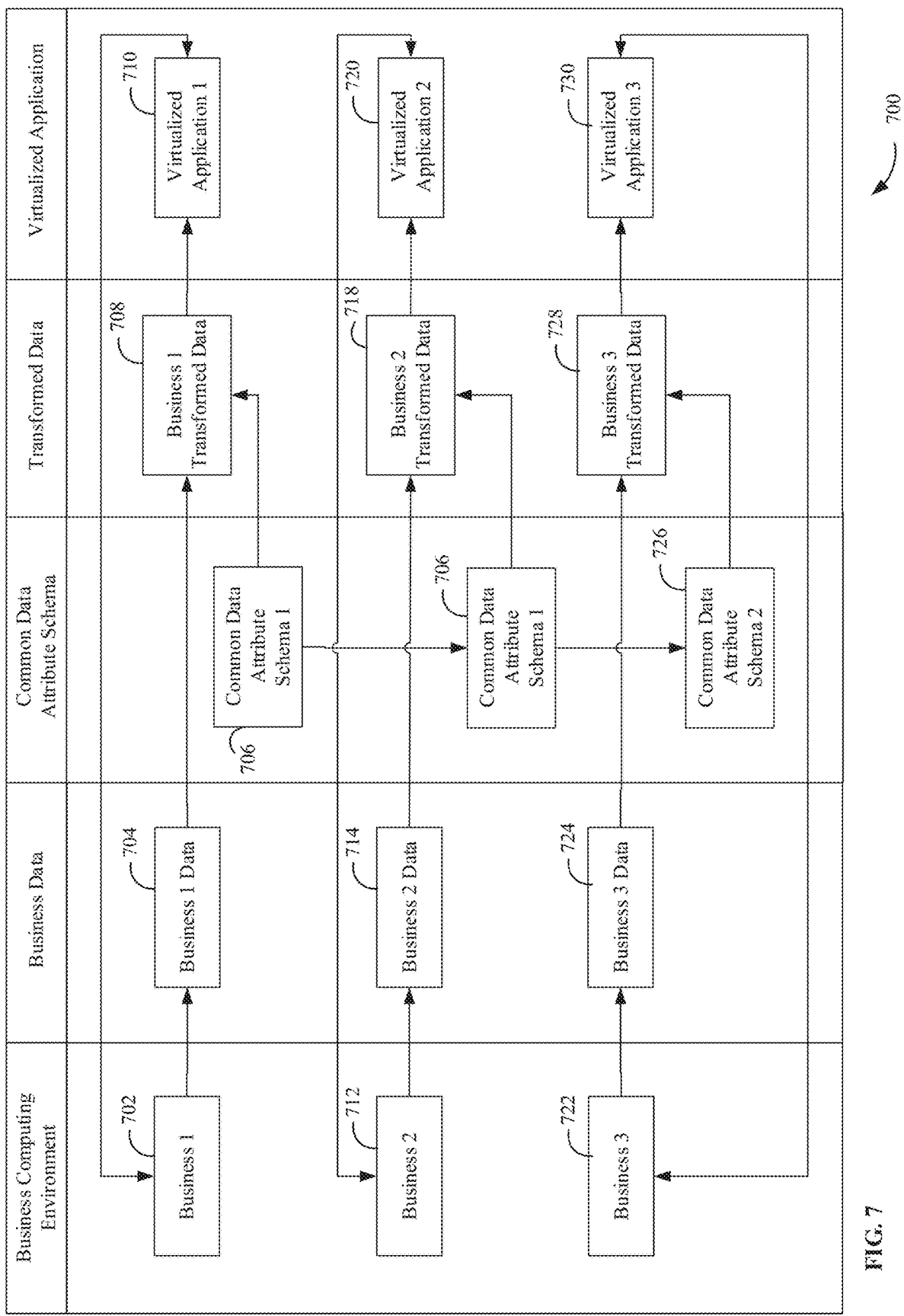
FIG. 7 is a flowchart of an illustrative process for generating and deploying ML applications for multiple businesses, in accordance with some embodiments of the technology described herein.

FIG. 7 is a flowchart of an illustrative process 700 for generating and deploying ML applications for multiple businesses. Business 1 data (704) may be received from a business computing environment for business 1 (702) (e.g., a first retailer). Common data attribute schema 1 (706) (e.g., as described with respect to FIG. 3, or any other suitable common data attribute schema) may indicate one or more attributes for which attribute values may be generated from business 1 data (704). Common data attribute schema 1 (706) may already exist or may be created or updated based on attributes in business 1 data (704). ETL processing code (e.g., ETL processing code 206 in FIG. 2A, or any other suitable processing code) may be executed to process business 1 data (704) in accordance with common data attribute schema 1 (706) and store the results as business 1 transformed data (708). Virtualized application 1 (710) (e.g., virtualized application 220 in FIG. 2A, or any other suitable virtualized ML application program) may receive and process business 1 transformed data (708) to generate input data for training an ML model and/or using the ML model for inference. In some embodiments, software code for one or more ML data processing pipelines within virtualized application 1 (710) may determine that values for one or more mandatory attributes are missing or incomplete. Virtualized application 1 (710) may generate an error notification and send a request to the business computing environment for business 1 (702) to supply values for the mandatory attributes. In some embodiments, virtualized application 1 (710) may provide ML output and/or information explaining the ML output to the business computing environment for business 1 (702).

At a later time, business 2 data (714) may be received from a business computing environment for business 2 (712) (e.g., a second retailer). Common data attribute schema 1 (706) may indicate one or more attributes for which attribute values may be generated from business 2 data (714). Because common data attribute schema 1 (706) already exists and the same attributes may be available in business 2 data (714), no further time or effort may need to be expended to update common data attribute schema 1 (706). Business 2 data (714) may be automatically processed including executing ETL processing code to generate business 2 transformed data (718) and providing business 2 transformed data (718) to virtualized application 2 (720) to generate input data for training an ML model and/or using the ML model for inference. In some embodiments, software code for one or more ML data processing pipelines within virtualized application 2 (720) may determine that values for one or more mandatory attributes are missing or incomplete. Virtualized application 2 (720) may generate an error notification and send a request to the business computing environment for business 2 (712) to supply values for the mandatory attributes. In some embodiments, virtualized application 2 (720) may provide ML output and/or information explaining the ML output to the business computing environment for business 2 (712).

At a later time, business 3 data (724) may be received from a business computing environment for business 3 (722) (e.g., a telecom provider). Common data attribute schema 1 (706), which indicates one or more attributes for which attribute values may be generated from business 1 data (704) or business 2 data (714), may need to be updated to include one or more new attributes from business 3 data (724). Common data attribute schema 2 (726) may be generated accordingly. Further, ETL processing code and/or software codes for ML data processing pipelines may need to be created or updated for processing values for the new attributes added to common data attribute schema 2 (726). The updated ETL processing code may be executed to process business 3 data (724) in accordance with common data attribute schema 2 (726) and store the results as business 3 transformed data (728). Virtualized application 3 (730) may receive and process business 3 transformed data (728) to generate input data for training an ML model and/or using the ML model for inference. In some embodiments, the updated software codes for one or more ML data processing pipelines within virtualized application 3 (730) may determine that values for one or more mandatory attributes are missing or incomplete. Virtualized application 3 (730) may generate an error notification and send a request to the business computing environment for business 3 (722) to supply values for the mandatory attributes. In some embodiments, virtualized application 3 (730) may provide ML output and/or information explaining the ML output to the business computing environment for business 3 (722).

Figure 8A:
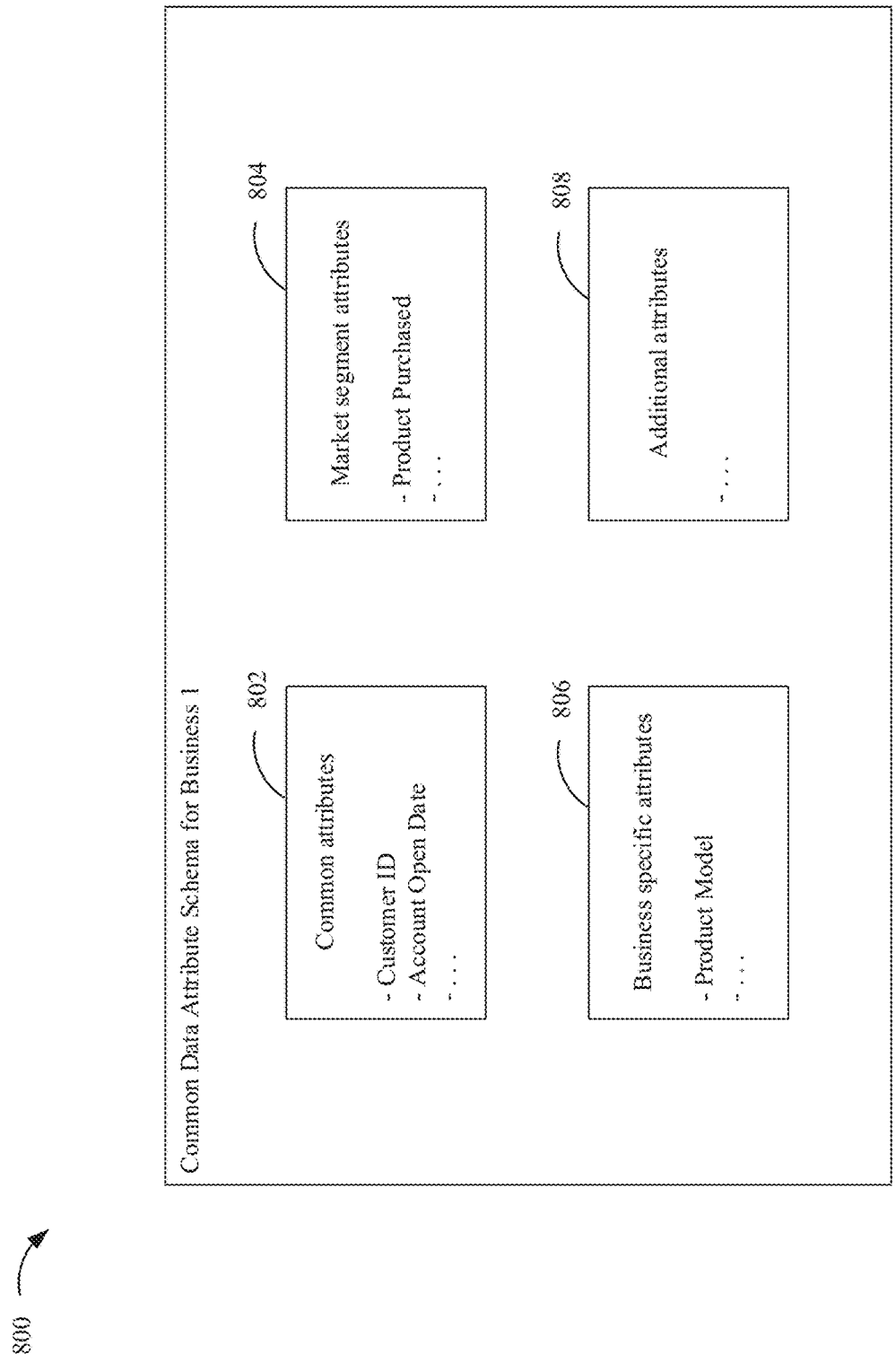
FIGS. 8A-8C are block diagrams illustrating changes made to a common data attribute schema based on business data received from different businesses, in accordance with some embodiments of the technology described herein.
Figure 8B:
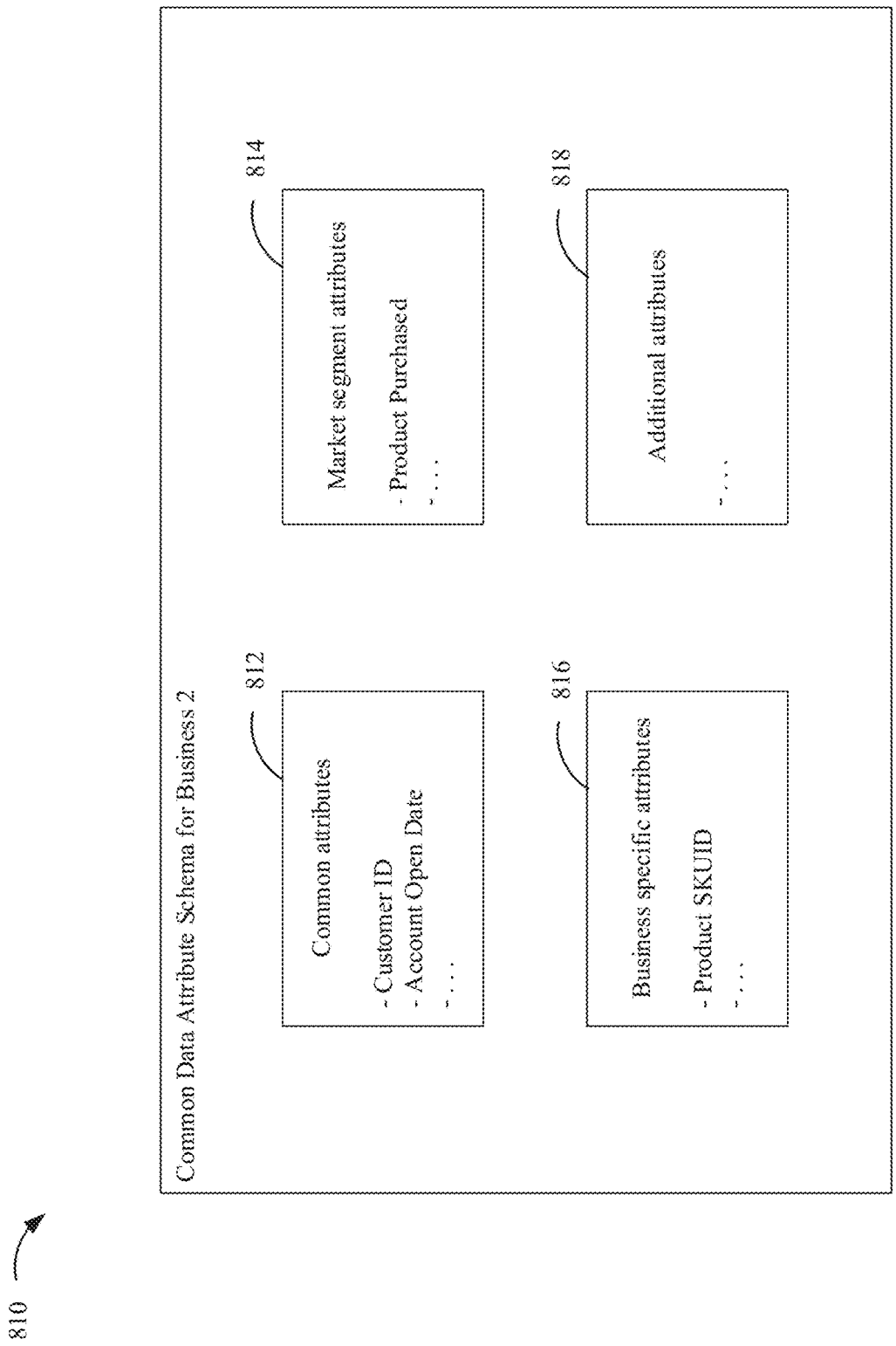
Figure 8C:
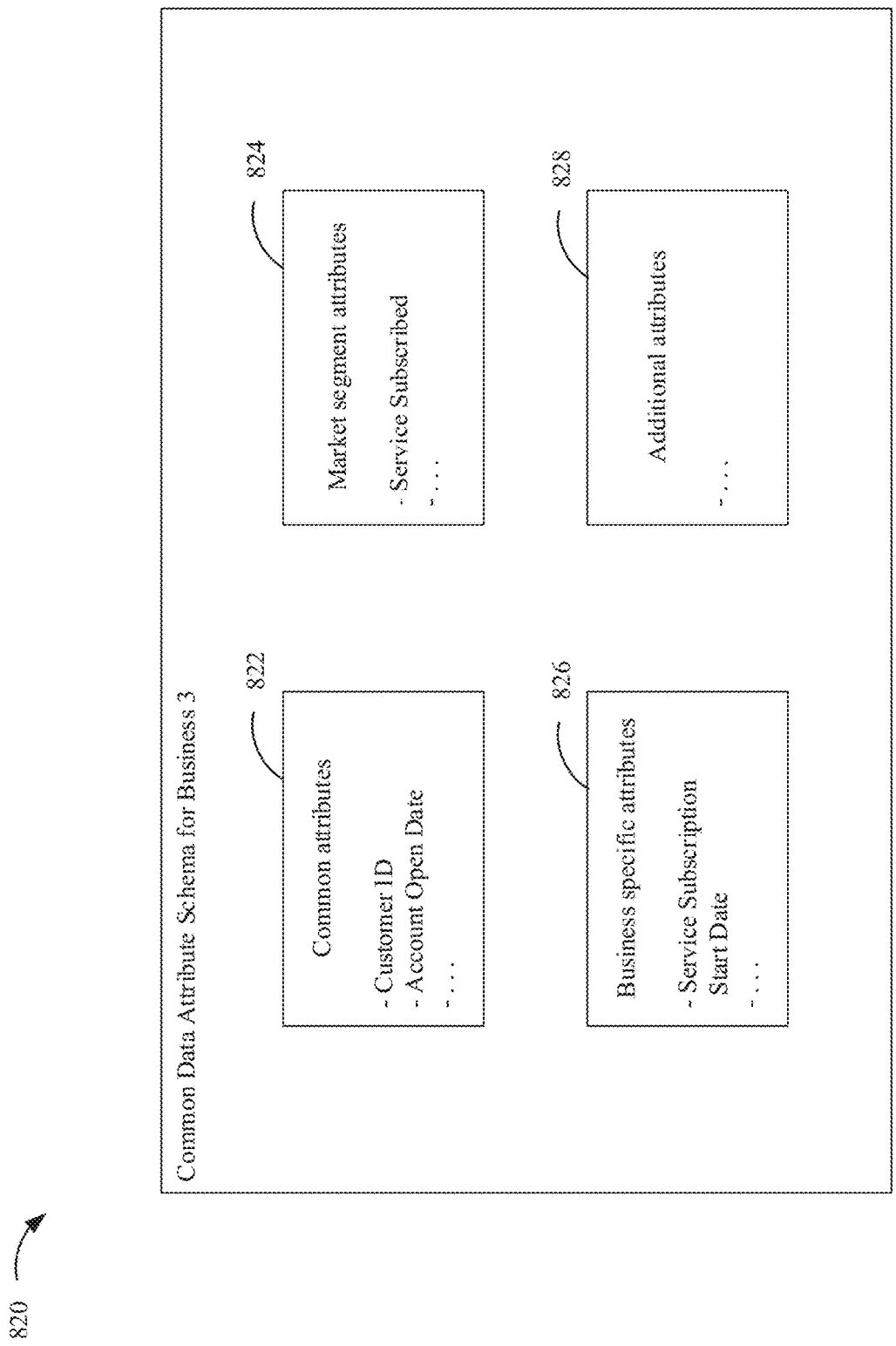

FIGS. 8A-8C are block diagrams illustrating changes made to a common data attribute schema based on business data received from different businesses. FIG. 8A illustrates common data attribute schema 800 for business 1 (e.g., a first retailer). Common data attribute schema 800 includes common attributes 802, market segment attributes 804, business specific attributes 806, and additional attributes 808. ETL processing code (e.g., ETL processing code 206 in FIG. 2A, or any other suitable processing code) may be executed to process business data for business 1 in accordance with common data attribute schema 800.

At a later time, business data from business 2 (e.g., a second retailer) may be received. Because common data attribute schema 800 already exists and shares some attributes present in business data from business 2, common data attribute schema 800 may be updated to generate common data attribute schema 810. FIG. 8B illustrates common data attribute schema 810 generated for business 2. Both businesses are in the same market segment but may have different business specific attributes. While business 1 uses Product Model as an attribute, business 2 may use a different attribute, Product SKUID, for capturing similar information. This change is reflected in business specific attributes 816, while common attributes 812, market segment attributes 814, and additional attributes 818 remain unchanged. After the change, ETL processing code may be executed to process business data for business 2 in accordance with common data attribute schema 810.

At a later time, business data from business 3 (e.g., a telecom provider) may be received. Common data attribute schema 810 for business 2 may be further updated to generate common data attribute schema 820 for business 3. FIG. 8C illustrates common data attribute schema 820 generated for business 3. These businesses may have differences in market segment attributes and business specific attributes. While business 2 uses Product Purchased as a market segment attribute, business 3 may use a different market segment attribute, Service Subscribed, to capture similar information. Similarly, while business 2 uses Product SKUID as a business specific attribute, business 3 may use a different business specific attribute, Service Subscription Start Date. These changes are reflected in market segment attributes 824 and business specific attributes 826, while common attributes 822 and additional attributes 828 remain unchanged. After the change, ETL processing code may be executed to process business data for business 3 in accordance with common data attribute schema 820.

Figure 9:
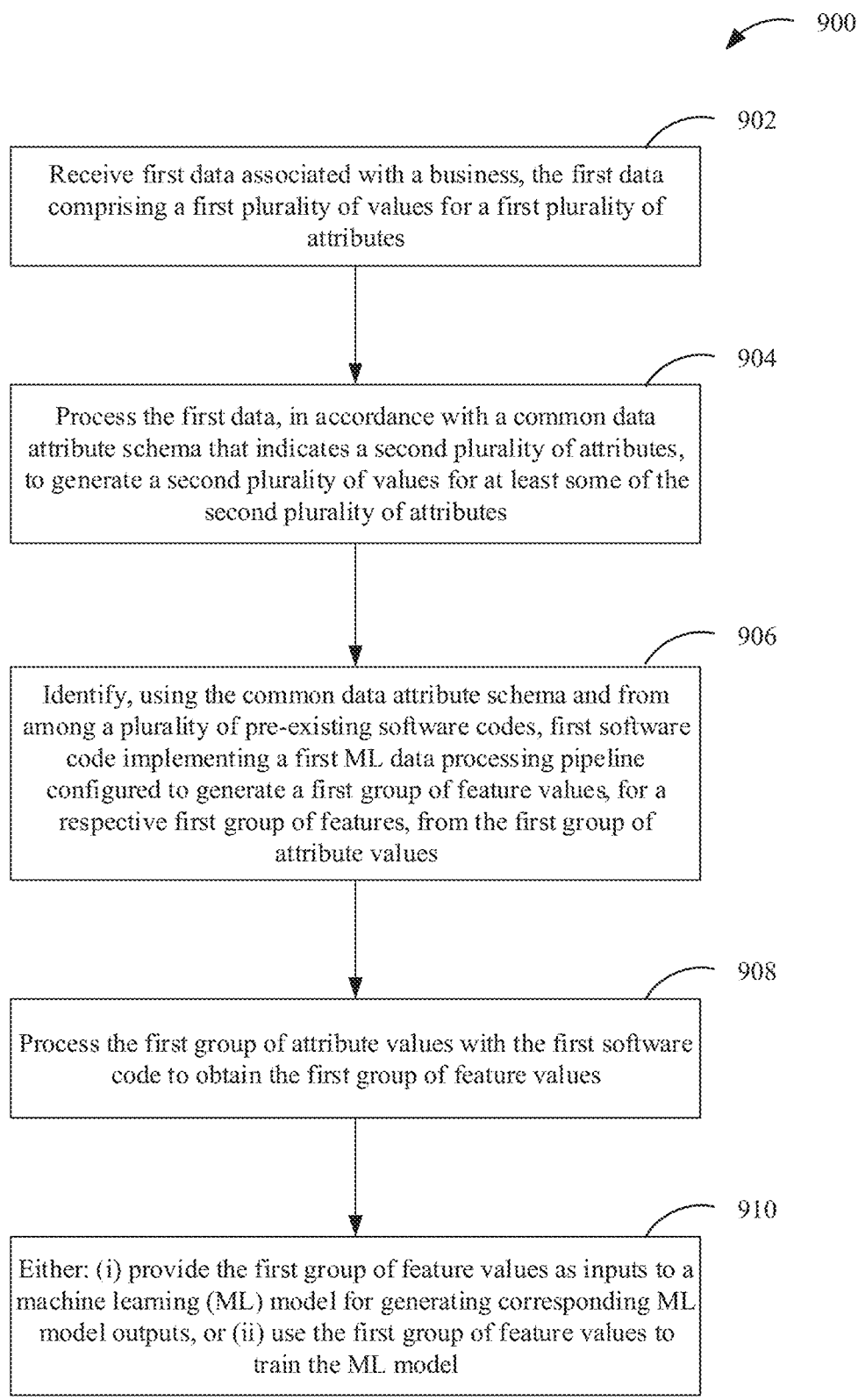
FIG. 9 is a flowchart of an illustrative process for processing data based on a common data attribute schema for using or training an ML model, in accordance with some embodiments of the technology described herein.

FIG. 9 is a flowchart of process 900 for processing data based on a common data attribute schema for using or training an ML model. At least some of the acts of process 900 may be performed by any suitable computing device(s) and, for example, may be performed by one or more of processor(s) 1202 shown in computing system 1200 of FIG. 12.

In act 902, process 900 receives first data associated with a business (e.g., a retailer or any other suitable business). In some embodiments, the first data may include first values for first attributes (e.g., attributes related to a customer of a retailer, such as Customer ID, Account open date, etc., or any other suitable attribute).

After act 902, process 900 proceeds to act 904, where process 900 processes the first data, in accordance with a common data attribute schema (e.g., as described with respect to FIG. 3, or any other suitable common data attribute schema) that indicates second attributes, to generate second values for at least some of the second attributes. In some embodiments, at least some of the second attributes for which the second values are generated may include a first group of attributes. The second values for at least some of the second attributes may include a first group of attribute values for the first group of attributes. In some embodiments, ETL processing code (e.g., ETL processing code 206 in FIG. 2A, or any other suitable code) may be executed to process the first data (e.g., business data 202 in FIG. 2A, or any other suitable data) in accordance with the common data attribute schema (e.g., common data attribute schema 204 in FIG. 2A, or any other suitable schema) to generate the second values for at least some of the second attributes (e.g., transformed business data 208 in FIG. 2A, or any other suitable data). It is appreciated that in some embodiments not all attributes present in the first data may be included in the common data attribute schema. Accordingly, the second values for at least some of the second attributes may be fewer in number than values for attributes present in the first data. In some embodiments, common data attribute schema may indicate a format for attribute values. For example, the format may include an ordering of the attributes, a file format (e.g., comma-separated values, EXCEL spreadsheet, etc.), or any other suitable format. It is appreciated that in some embodiments the second values for at least some of the second attributes may not be in the same order as the corresponding values for attributes present in the first data. Instead, the attributes values may be ordered as specified by the common data attribute schema.

In some embodiments, the common data attribute schema may indicate which attributes in the second attributes are mandatory or optional. For example, mandatory attributes may be required in order for the data to be processed by an ML data processing pipeline and may require the processor to generate an error notification when values are missing for one or more mandatory attributes (e.g., a common data attribute schema for an ML task for a retailer may specify Customer ID or any other suitable attribute as a mandatory attribute; also described with respect to FIG. 4). In another example, optional attributes may not be required in order for the data to be processed by an ML data processing pipeline. The processor may ignore the optional attribute, replace a value for the optional attribute with average value, a default value, or any other suitable value for the optional attribute, or otherwise address the missing value for the optional attribute without generating an error notification. In some embodiments, the common data attribute schema indicates a format for the second values. The act of processing the first data in accordance with the common data attribute schema includes formatting the accessed values according to the format indicated by the common data attribute schema. For example, the format may include an ordering of the attributes, a file format (e.g., comma-separated values, EXCEL spreadsheet, etc.), or any other suitable format.

After act 904, process 900 proceeds to act 906, where process 900 identifies, using the common data attribute schema and from among pre-existing software codes (e.g., software codes for implementing one or more ML data processing pipelines; also described with respect to FIG. 2D), first software code implementing a first ML data processing pipeline configured to generate a first group of feature values, for a respective first group of features, from the first group of attribute values. In some embodiments, the common data attribute schema may indicate one or more attributes (or groups of attributes) for which corresponding software codes for ML data processing pipelines are included in the pre-existing software codes. Using the common data attribute schema, the first group of attribute values may be provided to corresponding software code implementing the first ML data processing pipeline to generate the first group of feature values.

In some embodiments, the first software code implementing the first ML data processing pipeline may be configured to, when executed, generate the first group of feature values from the first group of attribute values using first data cleansing procedures (e.g., outlier detection code, data normalization code, data quality checking code, data enrichment code, any other suitable data cleansing procedures, or no data cleansing procedures where no data cleansing may be required; also described with respect to FIG. 6A) and first feature extraction procedures (e.g., code for determining values for a first group of features, code for determining values for a second group of features, and so on; also described with respect to FIG. 6B).

After act 906, process 900 proceeds to act 908, where process 900 processes the first group of attribute values with the first software code to obtain the first group of feature values. In some embodiments, the first software code is for an ML data processing pipeline (e.g., ML data processing pipeline 226 in FIG. 2A, or any other suitable ML data processing pipeline) and may be executed to process the first group of attribute values (which correspond to the ML data processing pipeline) to obtain the first group of feature values. For example, the first group of attribute values may include a value for attribute, Account Open Date, for a customer of a retailer business. The respective first group of features may include Account Age, Account Open Year, Account Open Month, Days To Next Renewal, or any other suitable feature.

In some embodiments, the acts of identifying, using the common data attribute schema and from among a plurality of pre-existing software codes, first software code implementing a first ML data processing pipeline and processing the first group of attribute values with the first software code may be performed automatically based on information in the common data attribute schema (e.g., without receiving additional user input for making this identification). For example, the information in the common data attribute schema may aid in mapping groups of attributes to ML data processing pipelines (e.g., as described with respect to FIG. 2C, or any other suitable information) for automatically making the identification.

After act 908, process 900 proceeds to act 910, where process 900 either: (i) provides the first group of feature values as inputs to an ML model for generating corresponding ML model outputs, or (ii) uses the first group of feature values to train the ML model (e.g., to initially train the ML model or to update a trained ML model). For example, the first group of feature values may be provided as input (e.g., input data 232 in FIG. 2A, or any other suitable input) to a trained ML model (e.g., trained ML model 234 in FIG. 2A, or any other suitable ML model) for generating corresponding ML model outputs. In another example, the first group of feature values may be used as training data. The ML model may include multiple parameters (e.g., hyperparameters or any other suitable model parameters). Training the ML model may include estimating values of at least some of the parameters using the training data (e.g., using a gradient descent algorithm, or any other suitable algorithm). In some embodiments, the values of at least some of the parameters may be estimated using one or more software libraries (e.g., TENSORFLOW, KERAS, or any other suitable software library).

In some embodiments, the above-described acts may be performed by a virtualized ML application program executing using at least one processor. In some embodiments, a virtualized application program may be any application program configured to execute on a virtual machine (e.g., a VMWARE virtual machine, an AZURE virtual machine, etc.). In some embodiments, a virtualized application program may be a containerized application program configured to execute in a container such as a DOCKER container, a MOBY container, etc.

It should be appreciated that process 900 is illustrative and that there are variations. In some embodiments, one or more of the acts of process 900 may be optional or be performed in a different order than shown in FIG. 9. For example, act 904 and act 906 may be performed in a different order. Alternatively, act 904 and act 906 may be performed in parallel.

Figure 10:
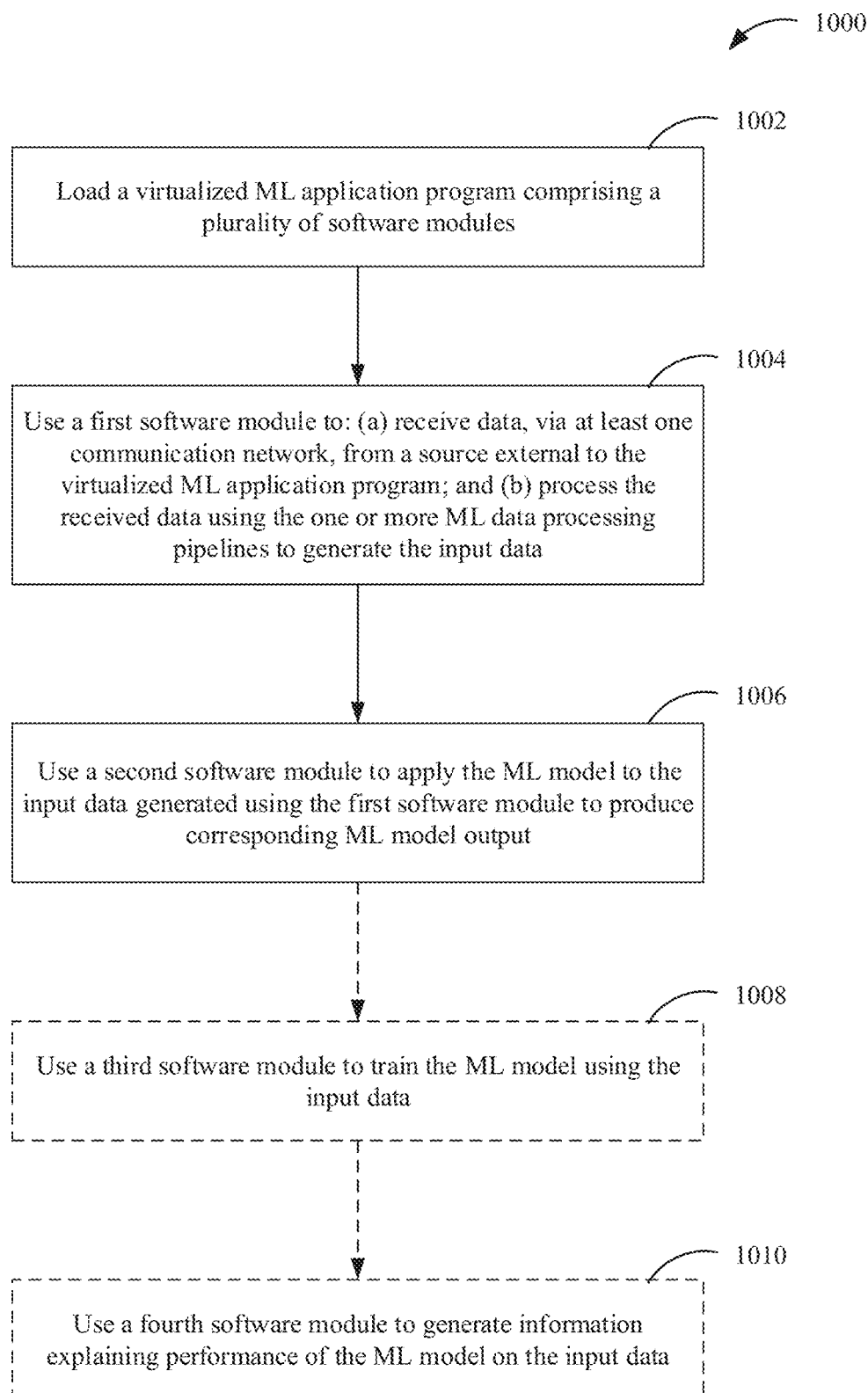
FIG. 10 is a flowchart of an illustrative process for using a virtualized ML application program associated with one or more ML tasks, in accordance with some embodiments of the technology described herein.

FIG. 10 is a flowchart of process 1000 for using virtualized ML application programs associated with different ML tasks (e.g., different tasks for one customer, different tasks for different customers, or a suitable combination thereof) using a computer hardware processor configured to execute virtualized application programs (e.g., a virtual machine configured to execute an ML application program, such as a VMWARE virtual machine or any other suitable virtual machine; a containerized application program, such as a DOCKER container application or any other suitable containerized application program; or any other suitable virtualized application program). At least some of the acts of process 1000 may be performed by any suitable computing device(s) and, for example, may be performed by one or more of processor(s) 1202 shown in computing system 1200 of FIG. 12.

In act 1002, process 1000 loads a virtualized ML application program including multiple software modules. In some embodiments, the multiple software modules may include a first software module configured to apply one or more ML data processing pipelines to received data to generate input data (e.g., a group of feature values for a respective group of features, or any other suitable input data) for providing as input to an ML model (e.g., a linear regression model, a non-linear regression model such as neural networks, support vector machines, etc., or any other suitable ML model) associated with a respective ML task. In some embodiments, the multiple software modules may further include a second software module configured to perform inference using the ML model. In some embodiments, the multiple software modules may include a third software module configured to train the ML model (e.g., initially train or update the ML model). In some embodiments, the multiple software modules include a fourth software module configured to generate information explaining performance of the ML model.

After act 1002, process 1000 proceeds to act 1004, where process 1000 uses the first software module to: (a) receive data, via at least one communication network, from a source external to the virtualized ML application program (e.g., a data store, a relational database, an object oriented database, a flat file, Hadoop, or any other suitable source of data); and (b) process the received data using the one or more ML data processing pipelines to generate the input data. In some embodiments, software code for an ML data processing pipeline may be executed to process received data including attribute values for a group of attributes corresponding to the ML data processing pipeline. For example, software code for the ML data processing pipeline (e.g., ML data processing pipeline 226 in FIG. 2A, or any other suitable ML data processing pipeline) may be executed to process received data (e.g., attribute values for a group of attributes, or any other suitable data) and generate input data (e.g., feature values for a group of features, or any other suitable data). In some embodiments, the input data may be provided as input for training an ML model or processing with a trained ML model. In some embodiments, software code for the ML data processing pipeline may include data cleansing procedures, feature extraction procedures, and/or any other code for processing received data to generate input data. The data cleansing procedures may include outlier detection code, data normalization code, data quality checking code, data enrichment code, and/or any other suitable code. The feature extraction procedures may include code for determining values for one or more groups of features. Further details for data cleansing procedures and feature extraction procedures are described with respect to FIGS. 6A and 6B, respectively.

After act 1004, process 1000 proceeds to act 1006, where process 1000 uses the second software module to apply the ML model to the input data generated using the first software module to produce corresponding ML model output. For example, input data (e.g., input data 232 in FIG. 2A, or any other suitable data) may be provided as input to a trained ML model (e.g., trained ML model 234 in FIG. 2A, or any other suitable ML model) for generating corresponding ML model output.

In some embodiments, after act 1006, process 1000 may end. In some embodiments, after act 1006, process 1000 may proceed to act 1008, where process 1000 uses the third software module to train the ML model using the input data. In some embodiments, the input data may include training data having training inputs and corresponding ground-truth outputs. The ML model may include multiple parameters (e.g., hyperparameters or any other suitable model parameters). The act of using the third software module to train the ML model may include estimating values of at least some of the parameters using the training data (e.g., using a gradient descent algorithm, or any other suitable algorithm). In some embodiments, the act of estimating values of at least some of the parameters may be performed using one or more software libraries (e.g., TENSORFLOW, KERAS, or any other suitable software library) part of the third software module in the virtualized ML application program.

In some embodiments, after act 1008, process 1000 may end. In some embodiments, after act 1008, process 1000 may proceed to act 1010, where process 1000 uses the fourth software module to generate information explaining performance of the ML model on the input data. For example, for an ML task for a retailer to predict a customer churn probability (e.g., a probability that the retailer will lose the customer in three months, six months, nine months, or any other suitable time period), the generated information may include input data features ordered by importance, feature sensitivity, or any other suitable information. In another example, for an ML task for a telecom provider to predict a customer churn probability, the ML output may indicate a high customer churn probability and the generated information may indicate the most important features to be Product Age and Number of Complaints (e.g., which may indicate that the customer's device is too old and relatedly the customer has been making frequent complaints of bad reception or call drops, which may help explain the high customer churn probability).

It should be appreciated that process 1000 is illustrative and that there are variations. In some embodiments, one or more of the acts of process 1000 may be optional or be performed in a different order than shown in FIG. 10. For example, act 1008 and act 1010 may be optional. Additionally or alternatively, act 1006, act 1008, and act 1010 may be performed in a different order.

Figure 11:
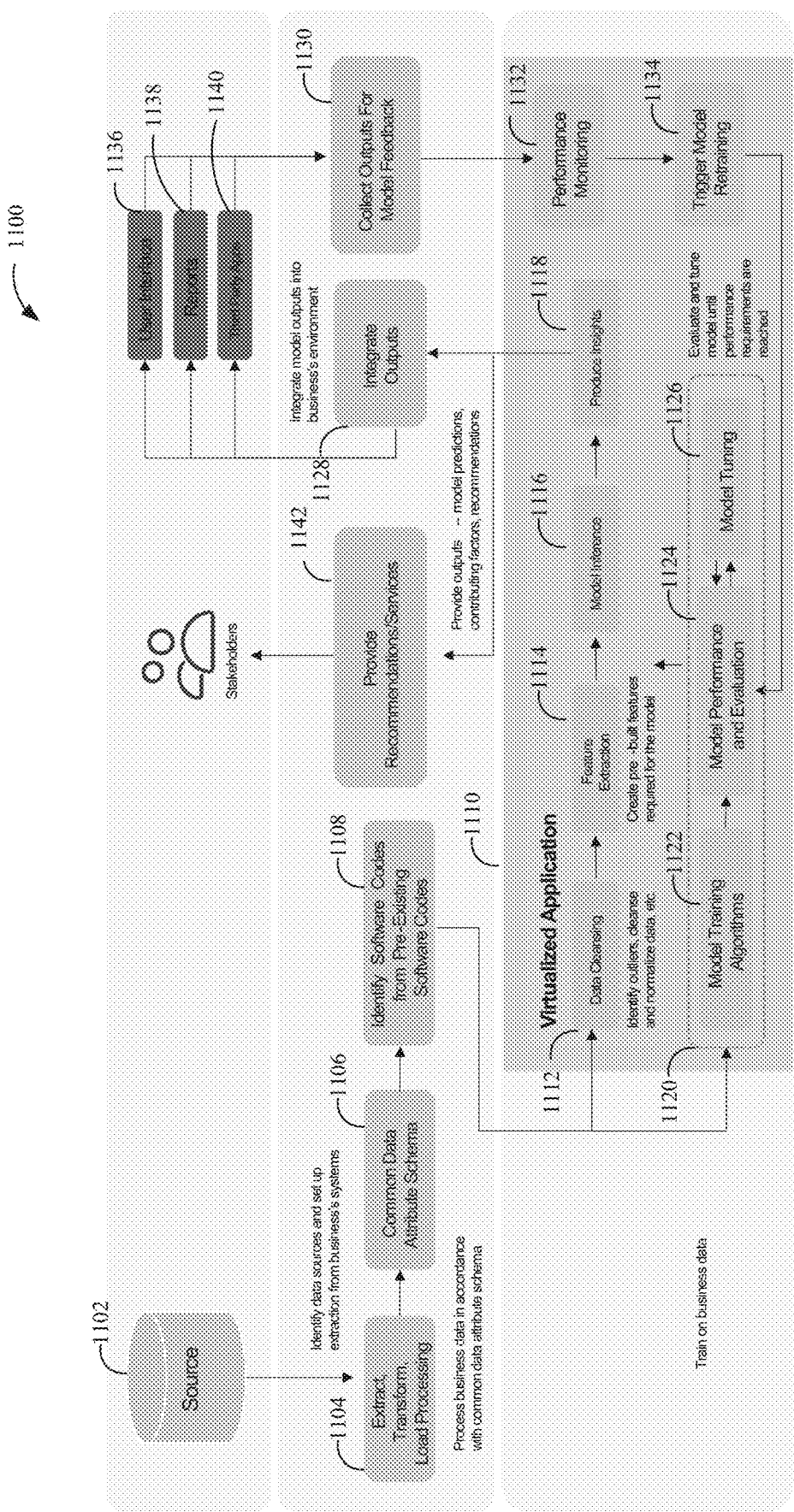
FIG. 11 is another block diagram illustrating techniques for generating and deploying an ML model in a virtualized ML application program, in accordance with some embodiments of the technology described herein.

FIG. 11 is a block diagram 1100 illustrating techniques for generating and deploying an ML model in a virtualized ML application program. Business data may be received from source 1102 external to virtualized application 1110, or any other suitable data source. The business data may include values for one or more attributes (e.g., attributes related to a customer of a retailer, such as Customer ID, Account Open Date, etc., or any other suitable attribute). Common data attribute schema 1106 (e.g., as described with respect to FIG. 3, or any other suitable common data attribute schema) may indicate one or more attributes for which attribute values may be generated from the business data. Common data attribute schema 1106 may further indicate, for the attributes, corresponding software codes for ML data processing pipelines (e.g., as described with respect to FIG. 2D, or any other suitable ML data processing pipelines) are stored in pre-existing software codes. Extract, Transform, Load processing code 1104 may be executed to process the business data in accordance with common data attribute schema 1106. Identify software codes 1108 may be executed to identify, using common data attribute schema 1106 and from among pre-existing software codes, groups of attributes and associated software codes for ML data processing pipelines. This information may be used to provide the processed business data to virtualized application 1110.

The processed business data may be provided as input to virtualized application 1110, which may include an ML data processing pipeline module for processing received data. Software code for an ML data processing pipeline may include data cleansing procedures 1112, feature extraction procedures 1114, and/or any other code for processing input data to be provided for training an ML model or processed with a trained ML model. The input data may be provided as input to a trained ML model in model inference module 1116 (deployed within virtualized application 1110) for generating corresponding ML model output. The ML model output may be provided to produce insights module 1118 to generate information explaining the ML output. Additionally or alternatively, the input data may be provided to training module 1120 for training the ML model. Training module 1120 may include model training algorithms 1122 for training an ML model (e.g., a linear regression model, a non-linear regression model such as neural networks, support vector machines, etc., or any other suitable ML model). Training module 1120 may further include model performance and evaluation code 1124 and model tuning code 1126 for assessing and improving performance of the trained ML model (e.g., to achieve model performance below a certain error threshold, or any other suitable target).

For example, for an ML task for a retailer to predict a customer churn probability (e.g., a probability that the retailer will lose the customer in three months, six months, nine months, or any other suitable time period), produce insights module 1118 may generate information including input data features ordered by importance, feature sensitivity, or any other suitable information. In some embodiments, the ML model includes a multi-layer neural network configured to detect objects in images, the input data includes an input image, and produce insights module 1118 may generate information explaining performance of the multi-layer neural network on the input image. For example, in the case of a deep learning based object detection task, the input may be a captured image, and the output may be an object type for the input (e.g., car, human, cow, truck, house, or any other suitable object type). In this example, the information explaining performance of the neural network may include an importance of each pixel and feature sensitivity for each color channel of each pixel. In some embodiments, the information explaining the performance of the multi-layer neural network on the input images includes information indicating, for at least some pixels in the input image, relative degrees to which the at least some of the pixels influenced the ML model output and information indicating, for each of the at least some of the pixels, a sensitivity of the ML model output to changes in a value of the pixel.

Virtualized application 1110 may be in communication with a business computing environment for the business, e.g., via a communication network (e.g., the Internet, a local network, or any other suitable communication network) or any other suitable means of communication. Virtualized application 1110 may provide information to the business computing environment. For example, virtualized application 1110 may provide ML output from model inference module 1116 and information explaining the ML output from produce insights module 1118 to recommendations/services module 1142. In another example, virtualized application 1110 may provide ML output from model inference module 1116 to integrate outputs module 1128 to process the ML output and provide related information via user interface 1136, reports 1138, and/or third party applications 1140 deployed for the business computing environment.

Virtualized application 1110 may receive new data from collect outputs module 1130. The new data may provide ground truth outputs for previous inputs on which the trained ML model was applied to generate ML outputs. Additionally or alternatively, the new data may include additional training data from recent customers to which the trained ML model has not yet been applied. The new data may be used to monitor performance of the trained ML model using performance monitoring module 1132. Based on monitoring the performance, trigger model retraining module 1134 may trigger an update for the trained ML model if the model performance is below a specified threshold. For example, if the model's performance for the ML output is not below a specified error threshold, trigger model retraining module 1134 may trigger an update for the trained ML model using prior training data and/or the new data. Additionally or alternatively, trigger model retraining module 1134 may trigger an update for the trained ML model on a periodic basis (e.g., every week, every month, every two months, or any other suitable interval). Additionally or alternatively, trigger model retraining module 1134 may trigger an update for the trained ML model when a threshold amount of new data is available (e.g., 20% of the size of the training data initially used to generate the trained ML model, 50% of the size of the training data initially used to generate the trained ML model, or any other suitable threshold).

An illustrative implementation of a computing system 1200 that may be used in connection with any of the embodiments of the disclosure provided herein is shown in FIG. 12. For example, any of the computing devices described above may be implemented as computing system 1200. The computing system 1200 may include one or more computer hardware processors 1202 and one or more articles of manufacture that comprise non-transitory computer-readable storage media (e.g., memory 1204 and one or more non-volatile storage devices 1206). The processor(s) 1202 may control writing data to and reading data from the memory 1204 and the non-volatile storage device(s) 1206 in any suitable manner. To perform any of the functionality described herein, the processor(s) 1202 may execute one or more processor-executable instructions stored in one or more non-transitory computer-readable storage media (e.g., the memory 1204), which may serve as non-transitory computer-readable storage media storing processor-executable instructions for execution by the processor(s) 1202.

The terms "program" or "software" are used herein in a generic sense to refer to any type of computer code or set of processor-executable instructions that may be employed to program a computer or other processor to implement various aspects of embodiments as described above. Additionally, according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for using virtualized machine learning (ML) application programs associated with different ML tasks, the method comprising:
   using at least one computer hardware processor, which is configured to execute virtualized application programs, to perform:
      loading a virtualized ML application program comprising a plurality of software modules, the plurality of software modules including:
         a first software module configured to apply one or more ML data processing pipelines to received data to generate input data for providing as input to an ML model associated with a respective ML task; and
         a second software module configured to perform inference using the ML model;
      using the first software module to: (a) receive data, via at least one communication network, from a source external to the virtualized ML application program; and (b) process the received data using the one or more ML data processing pipelines to generate the input data; and
      using the second software module to apply the ML model to the input data generated using the first software module to produce corresponding ML model output,
   wherein the received data comprises attribute values for a plurality of attributes,
   wherein the input data comprises feature values for a plurality of features, and
   wherein the one or more ML data processing pipelines are configured to process the received data by:

applying one or more data cleansing procedures to at least some of the attribute values to obtain cleansed attribute values; and applying one or more feature extraction procedures to the cleansed attribute values to obtain the feature values, wherein the plurality of attributes comprises groups of attributes including a first group of attributes and a second group of attributes, wherein the attribute values comprise groups of attribute values including a first group of attribute values for the first group of attributes and a second group of attribute values for the second group of attributes, wherein the plurality of features comprises groups of features including a first group of features and a second group of features, wherein the feature values comprise groups of feature values including a first group of feature values for the first group of features and a second group of feature values for the second group of features, and wherein the one or more ML data processing pipelines comprise:
a first ML data processing pipeline to generate the first group of feature values from the first group of attribute values using first data cleansing procedures and first feature extraction procedures;
a second ML data processing pipeline to generate the second group of feature values from the second group of attribute values using second data cleansing procedures different from the first data cleansing procedures and second feature extraction procedures different from the first feature extraction procedures.

2. The method of claim 1, wherein the plurality of software modules further comprises a third software module configured to train the ML model, the method further comprising:
using the third software module to train the ML model using the input data.

3. The method of claim 2,
wherein the input data comprises training data having a plurality of training inputs and a corresponding plurality of ground-truth outputs,
wherein the ML model comprises a plurality of parameters, and
wherein using the third software module to train the ML model comprises estimating values of at least some of the plurality of parameters using the training data.

4. The method of claim 3, wherein the estimating is performed using one or more software libraries part of the third software module in the virtualized ML application program.

5. The method of claim 2, wherein the plurality of software modules further comprises a fourth software module configured to generate information explaining performance of the ML model, the method further comprising:
using the fourth software module to generate information explaining performance of the ML model on the input data.

6. The method of claim 5,
wherein the input data comprises a plurality of values for a respective plurality of features; and
wherein the information explaining performance of the ML model on the input data indicates, for at least some of the plurality of features, relative degrees to which the at least some of the plurality of features influenced the ML model output.

7. The method of claim 5,
wherein the input data comprises a plurality of values for a respective plurality of features; and
wherein the information explaining performance of the ML model on the input data indicates, for each of at least some of the plurality of features, a sensitivity of the ML model output to changes in a value of the feature.

8. The method of claim 5, wherein the ML model comprises a multi-layer neural network configured to detect objects in images, wherein the input data comprises an input image, and wherein the information explaining performance of the ML model on the input data comprises information explaining performance of the multi-layer neural network on the input image.

9. The method of claim 8, wherein the information explaining the performance of the multi-layer neural network on the input images comprises:
information indicating, for at least some pixels in the input image, relative degrees to which the at least some of the pixels influenced the ML model output; and
information indicating, for each of the at least some of the pixels, a sensitivity of the ML model output to changes in a value of the pixel.

10. The method of claim 1, wherein the source external to the virtualized ML application program comprises a data store part of a computing system that does not execute the virtualized ML application program.

11. The method of claim 10, further comprising providing, via the at least one communication network, the ML model output to the source external to the virtualized ML application program.

12. The method of claim 1, wherein the first software module comprises processor-executable instructions that, when executed by the at least one computer hardware processor, cause the at least one computer hardware processor to (a) receive the data, via the at least one communication network, from the source external to the virtualized ML application program; and (b) process the received data using the one or more ML data processing pipelines to generate the input data.

13. The method of claim 1, wherein the second software module comprises processor-executable instructions that, when executed by the at least one computer hardware processor, cause the at least one computer hardware processor to apply the ML model to the input data generated using the first software module to produce the corresponding ML model output.

14. The method of claim 1,
wherein the at least one computer hardware processor is configured to execute a virtualized application software engine,
wherein the virtualized application software engine is configured to execute multiple different virtualized ML application programs corresponding to different ML tasks, and
wherein the method further comprises executing, with the virtualized application software engine, the multiple different virtualized ML application programs corresponding to the different ML tasks.

15. The method of claim 1, wherein the virtualized ML application program comprises a virtual machine configured to execute an ML application program comprising the plurality of software modules.

16. The method of claim 1, wherein the virtualized ML application program comprises a containerized application program comprising the plurality of software modules.

17. The method of claim 1, wherein the ML model comprises a linear regression model or a non-linear regression model.

18. The method of claim 1, wherein the ML model comprises an ML model configured to map inputs to outputs in a finite set of outputs corresponding to classification labels or actions.

19. A system, comprising:
at least one computer hardware processor configured to execute virtualized application programs; and
at least one non-transitory computer-readable storage medium storing processor executable instructions that, when executed by the at least one computer hardware processor, cause the at least one computer hardware processor to perform a method for using virtualized machine learning (ML) application programs associated with different ML tasks, the method comprising:
loading a virtualized ML application program comprising a plurality of software modules, the plurality of software modules including:
a first software module configured to apply one or more ML data processing pipelines to received data to generate input data for providing as input to an ML model associated with a respective ML task; and
a second software module configured to perform inference using the ML model;
using the first software module to: (a) receive data, via at least one communication network, from a source external to the virtualized ML application program; and (b) process the received data using the one or more ML data processing pipelines to generate the input data; and
using the second software module to apply the ML model to the input data generated using the first software module to produce corresponding ML model output,
wherein the received data comprises attribute values for a plurality of attributes,
wherein the input data comprises feature values for a plurality of features, and
wherein the one or more ML data processing pipelines are configured to process the received data by:
applying one or more data cleansing procedures to at least some of the attribute values to obtain cleansed attribute values; and
applying one or more feature extraction procedures to the cleansed attribute values to obtain the feature values,
wherein the plurality of attributes comprises groups of attributes including a first group of attributes and a second group of attributes,
wherein the attribute values comprise groups of attribute values including a first group of attribute values for the first group of attributes and a second group of attribute values for the second group of attributes,
wherein the plurality of features comprises groups of features including a first group of features and a second group of features,
wherein the feature values comprise groups of feature values including a first group of feature values for the first group of features and a second group of feature values for the second group of features, and
wherein the one or more ML data processing pipelines comprise:
a first ML data processing pipeline to generate the first group of feature values from the first group of attribute values using first data cleansing procedures and first feature extraction procedures;
a second ML data processing pipeline to generate the second group of feature values from the second group of attribute values using second data cleansing procedures different from the first data cleansing procedures and second feature extraction procedures different from the first feature extraction procedures.

20. At least one non-transitory computer-readable storage medium storing processor executable instructions that, when executed by at least one computer hardware processor configured to execute virtualized application programs, cause the at least one computer hardware processor to perform a method for using virtualized machine learning (ML) application programs associated with different ML tasks, the method comprising:
loading a virtualized ML application program comprising a plurality of software modules, the plurality of software modules including:
a first software module configured to apply one or more ML data processing pipelines to received data to generate input data for providing as input to an ML model associated with a respective ML task; and
a second software module configured to perform inference using the ML model;
using the first software module to: (a) receive data, via at least one communication network, from a source external to the virtualized ML application program; and (b) process the received data using the one or more ML data processing pipelines to generate the input data; and
using the second software module to apply the ML model to the input data generated using the first software module to produce corresponding ML model output,
wherein the received data comprises attribute values for a plurality of attributes,
wherein the input data comprises feature values for a plurality of features, and
wherein the one or more ML data processing pipelines are configured to process the received data by:
applying one or more data cleansing procedures to at least some of the attribute values to obtain cleansed attribute values; and
applying one or more feature extraction procedures to the cleansed attribute values to obtain the feature values,
wherein the plurality of attributes comprises groups of attributes including a first group of attributes and a second group of attributes,
wherein the attribute values comprise groups of attribute values including a first group of attribute values for the first group of attributes and a second group of attribute values for the second group of attributes,
wherein the plurality of features comprises groups of features including a first group of features and a second group of features,
wherein the feature values comprise groups of feature values including a first group of feature values for the first group of features and a second group of feature values for the second group of features, and
wherein the one or more ML data processing pipelines comprise:
a first ML data processing pipeline to generate the first group of feature values from the first group of attribute values using first data cleansing procedures and first feature extraction procedures;
a second ML data processing pipeline to generate the second group of feature values from the second group of attribute values using second data cleansing procedures different from the first data cleansing procedures and second feature extraction procedures different from the first feature extraction procedures.

* * * * *